United States Patent
Harriman et al.

(10) Patent No.: US 8,813,423 B2
(45) Date of Patent: Aug. 26, 2014

(54) PLANT GROWING SYSTEM CONTAINING A SUPER AMOUNT OF A CONTROLLED-RELEASED FERTILIZER AND METHODS OF USING THE SAME

(71) Applicants: Robert W. Harriman, Delaware, OH (US); Tim J. McNamara, Powell, OH (US); Joseph L. Craig, Marysville, OH (US); Joseph M. Dipaola, High Point, NC (US); Alexander P. Prohodski, Amherst, NH (US)

(72) Inventors: Robert W. Harriman, Delaware, OH (US); Tim J. McNamara, Powell, OH (US); Joseph L. Craig, Marysville, OH (US); Joseph M. Dipaola, High Point, NC (US); Alexander P. Prohodski, Amherst, NH (US)

(73) Assignees: Syngenta Participations AG, Basel (CH); OMS Investments, Inc., Los Angeles, CA (US)

( * ) Notice: Subject to any disclaimer, the term of this patent is extended or adjusted under 35 U.S.C. 154(b) by 0 days.

(21) Appl. No.: 13/844,328

(22) Filed: Mar. 15, 2013

(65) Prior Publication Data
US 2013/0283485 A1 Oct. 24, 2013

Related U.S. Application Data

(60) Provisional application No. 61/625,992, filed on Apr. 18, 2012.

(51) Int. Cl.
C05D 9/00 (2006.01)
A01H 5/00 (2006.01)
A01G 7/00 (2006.01)

(52) U.S. Cl.
CPC ........................................ *A01G 7/00* (2013.01)
USPC ...................... 47/58.1 SC; 800/323; 800/323.1

(58) Field of Classification Search
CPC ............. A01G 7/06; A01G 7/00; C05G 1/00; C05G 3/00; C05G 3/06; C05G 3/04; C05G 3/10; C05D 9/00
USPC ......... 47/58.1 SC, 48.5; 800/298, 323, 323.1; 71/31, 64.1; 239/1
See application file for complete search history.

(56) References Cited

U.S. PATENT DOCUMENTS

| | | | | |
|---|---|---|---|---|
| 4,014,675 | A * | 3/1977 | Osburn | .............................. 71/28 |
| 5,317,834 | A | 6/1994 | Anderson | |
| 5,435,821 | A | 7/1995 | Duvdevani et al. | |
| 2006/0112629 | A1* | 6/2006 | Wright | ........................... 47/59 S |
| 2006/0162027 | A1 | 7/2006 | Sivasankar et al. | |

OTHER PUBLICATIONS

Andiru et al. OFA Grower Impatiens grown with CRF perform better in the garden. OFA Bulletin Mar./Apr. 2010, No. 920, 19-20 including page with Tables.*

Richards et al. New Guinea Impatiens growth response and nutrient release from controlled-release fertilizer in a recirculating subirrigation and top-watering system. HortScience 39(2):280-286, 2004.*
Schnelle et al. Containers and Media for the Nursery, Oklahoma Cooperative Extension Service HLA-6706, no date but HLA-6706 reference cited below has date of 2007, 6706-1-6706-4.*
Oklahoma Cooperative Extension Service HLA-6706, document properties created 2007, one page.*
Argo et al. Fertilizer Containers. Fertilizing Containers/Greenhouse Grower 2008 retrieved on Mar. 10, 2014, retrieved from the Internet at <http://www.greenhousegrower.com/crop-inputs/fertilization/fertilizing-containers/> 3pp.*
International Search Report for PCT/US13/32692 dated Jun. 5, 2013.
Written Opinion of the International Searching Authority for International Patent Application PCT/US13/32692 dated Jun. 5, 2013.
Andiru, Effects of Controlled-Release Fertilizer on Nutrient Leaching and Garden Performance of *Impatiens walleriana* (Hook. F. 'Xtreme Scarlet'), pp. 1-121, Masters Thesis, 2010, The Ohio State University.
Castro, et al. "Spent Oyster Mushroom Substrate in a Mix With Organic Soil for Plant Pot Cultivation", Micologia Aplicada Internacional, Jan. 2008, pp. 17-26, vol. 20, No. 001, Puebla, Mexico.
Cavins, et al. "Monitoring and Managing pH and EC Using the PourThru Extraction Method", Horticulture Information Leaflet 590, Jul. 2000, pp. 1-17, North Carolina State University College of Agriculture & Life Sciences, Department of Horticultural Science.
Conover, et al. "Using the Pour Through Nutrient Extraction Procedure Production Regimes: Optimum Fertilizer Rates and Associated Leachate Electrical Conductivity Levels of Twelve Foliage Plants", CFREC-Apopka Research Report RH-92-24, University of Florida, IFAS, retrieved from the Internet on Sep. 19, 2013, http://mrec.ifas.ufl.edu/foliage/resrpts/rh_92_24.htm.
Dole, et al. "Cutting Propagation (Table 7.1)", 2006, p. 85, Ball Publishing.
Nell, et al. "Fertilization Termination Influences Postharvest Performance of Pot Chrysanthemum," HortScience , Dec. 1989, pp. 996-998, vol. 24, No. 6, The American Society for Horticultural Science.
Warncke et al., "Greenhouse Growth Media: Testing & Nutrition Guidelines", Extension Bulletin E-1736, Sep. 1983, Cooperative Extension Service, Michigan State University.
"Everris Spoon Rate Guide," dated 2012.
Dole & Gibson *Cutting Propagation*: A Guide to Propagating and Producing Floriculture Crops, Ball Publishing, Batavia, IL. (2006) p. 85 (Table 7.1).

* cited by examiner

*Primary Examiner* — June Hwu
(74) *Attorney, Agent, or Firm* — Hunton & Williams LLP

(57) ABSTRACT

The invention relates to a plant growing system having (a) plant life; (b) a super amount of a controlled-release fertilizer to provide season-long performance; and (c) growing media. The planting growing system may also include a moisture control agent or a plant protection agent. Despite the high EC values of the growing system, the combination of materials that make up the growing system nevertheless produces superior performing plants with darker green, healthier-looking leaves; superior growth, fill and spread; more abundant production of flowers and fruits; and a more developed, sustaining root system. Moreover, these plants are far less susceptible to the effects of pests such as fungi (e.g., *Fusarium* and *Rhizoctonia*), pythium, caterpillars, thrips, whiteflies, and other pests.

39 Claims, 13 Drawing Sheets
(7 of 13 Drawing Sheet(s) Filed in Color)

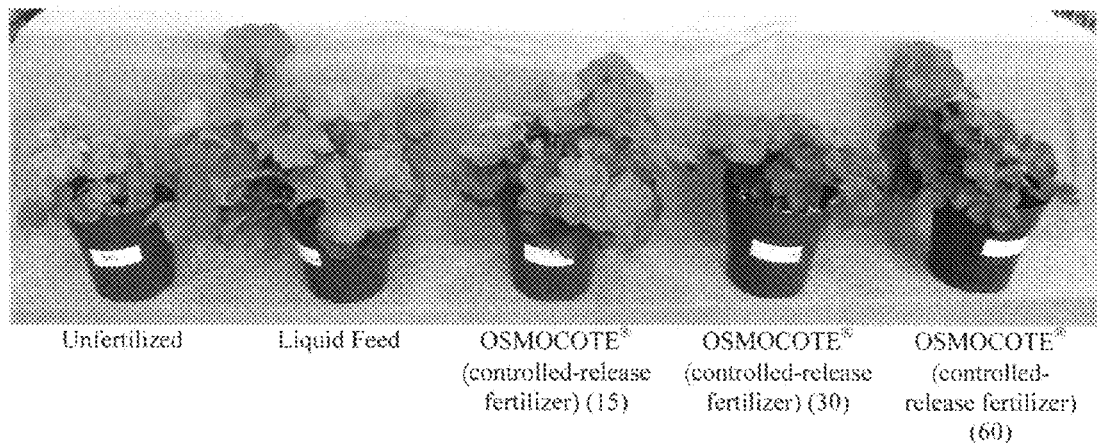
FIG. 1
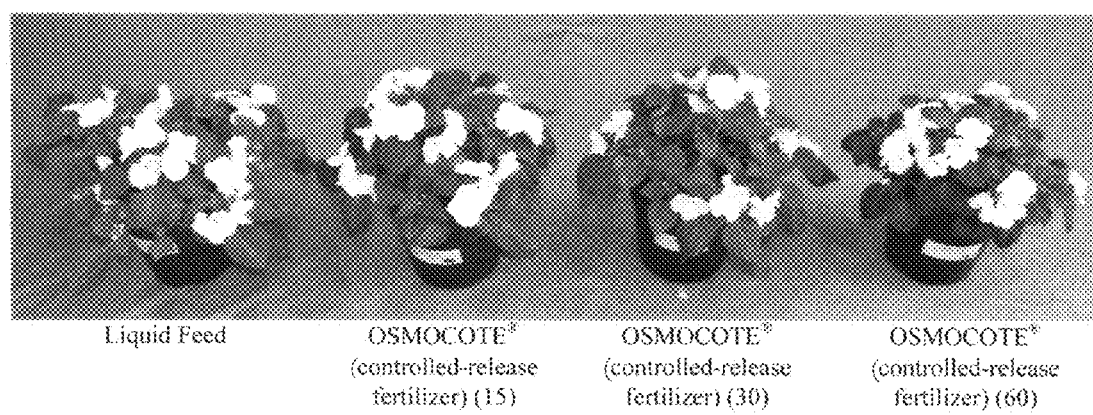
FIG. 2
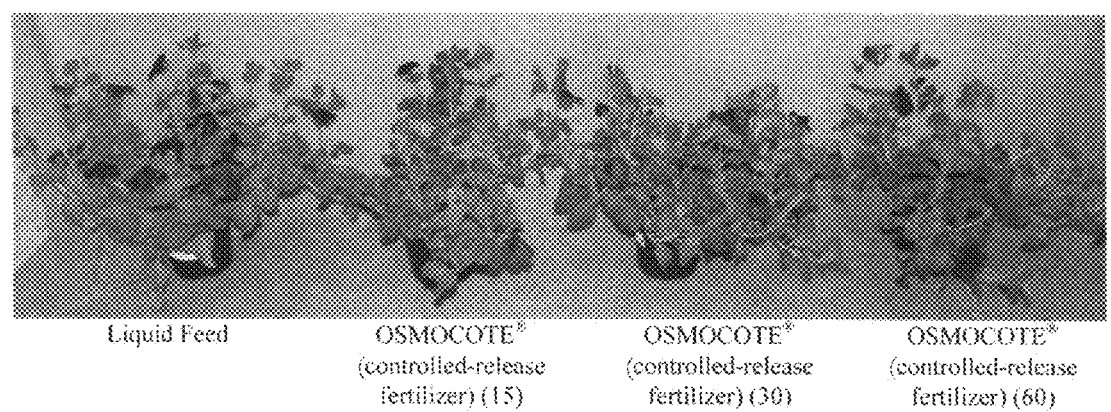

Liquid Feed | OSMOCOTE® (controlled-release fertilizer) (15) | OSMOCOTE® (controlled-release fertilizer) (30) | OSMOCOTE® (controlled-release fertilizer) (60)

Liquid Feed | OSMOCOTE® (controlled-release fertilizer) (15) | OSMOCOTE® (controlled-release fertilizer) (30) | OSMOCOTE® (controlled-release fertilizer) (60)

PLANT GROWING SYSTEM CONTAINING A SUPER AMOUNT OF A CONTROLLED-RELEASED FERTILIZER AND METHODS OF USING THE SAME

CROSS-REFERENCE TO RELATED APPLICATIONS

This application claims priority to U.S. Provisional Application No. 61/625,992, filed Apr. 18, 2012.

FIELD OF THE INVENTION

The invention relates to plant growing systems that include plant life, a super amount of a controlled-release fertilizer to provide season-long performance (e.g., in the field, patio or hanging baskets), and growing media (e.g., soilless growing media). Methods of using the plant growing systems are also provided.

DESCRIPTION OF RELATED ART

Controlled-release fertilizers (CRF) are well known in the art. These fertilizers are coated with materials that release nutrients (e.g., nitrogen, phosphorus, potassium) into soil or media for a plant's benefit over time. For example, OSMO-COTE® Plus (controlled-release fertilizer) is a CRF that releases nutrients over 3 to 14 month periods depending on factors including the amount of coating and prill size.

Plants vary in their fertility requirements for achieving optimal growth. Indeed, plants may be characterized as light feeders (e.g., Begonias, Impatiens), medium feeders (e.g., Petunias, Geraniums), or heavy feeders (e.g., Poinsettias). Each class of feeders may tolerate varying, levels of salt, measured as electrical conductivity (EC): light feeders (EC ~0.76 to 2 mS/cm), medium feeders (EC ~1.5 to 3.0 mS/cm), and heavy feeders (EC ~2.0 to 3.5 mS/cm) using the saturated media extract (SME) procedure. See Cavins et al., "Monitoring and Managing pH and EC Using the PourThru Extraction Method," Horticulture Information Leaflet 590, July, 2000.

High EC is detrimental to plants and is associated with poor shoot and root growth. For example, an EC greater than 6.0 (using the SME procedure) or greater than 7.8 (using the PourThru extraction procedure) will result in salt injury to most crops. Some studies using the PourThru extraction procedure have shown that an EC above 4.7 is high and may damage sensitive plants; above 6.6 is very high with potential damage to most plants, and above 7.8 is extreme with most crops damaged. See, e.g., John M. Dole and James L. Gibson, Cutting Propagation 85 (Table 7.1) (Ball Publishing 2006); see also D. D. Warncke and D. M. Krauskopf, *Extension Bulletin* E-1736 (1983). A high EC may be caused by applying a greater amount of fertilizer than is required by the plant. Accordingly, one method of reducing EC is to reduce the fertilization rate by providing less fertilizer. See Cavins et al., supra.

A recent study reviewed the effects of CRF on nutrient leaching. See Andiru, G., "Effects of Controlled-Released Fertilizer on Nutrient Leaching and Garden Performance of *Impatiens walleriana* (Hook. F., "Extreme Scarlet," Masters Thesis, The Ohio State University, 2010). The report found, among other things, that low to medium CRF application rates (3.4-6.8 kg/m$^3$; 2.5-5 g/container) produced commercially acceptable plant quality, whereas a higher CRF application rate (13.6 kg/m$^3$; 10 g/container) resulted in smaller canopy cover than the control. Moreover, "if high fertilizer rates were used, high initial release might not favor growth of young plants." See Andiru, supra. Accordingly, the study confirms that high fertility loads should be avoided for obtaining superior performing plants.

SUMMARY OF VARIOUS EMBODIMENTS OF THE INVENTION

The embodiments of the invention relate to a plant growing system having, among other things, a fertility load that would not have been expected to produce superior plants. In particular, the invention includes plant life, a super amount of a controlled-release fertilizer (CRF) to provide season-long performance (e.g., in the field, patio or hanging baskets), and growing media. A moisture control agent and/or a plant protection agent may also be included. The growing system according to the embodiments of the present invention has high EC values because of the high fertility load. For that reason, the inventors have surprisingly found that, despite the high EC values of the growing system, the combination of materials that make up the growing system nevertheless produces superior performing plants with darker green, healthier-looking leaves; superior growth, fill and spread; more abundant production of flowers and fruits; and a more developed, sustaining root system. Moreover, these plants are far less susceptible to the effects of pests such as fungi (e.g., *Fusarium* and *Rhizoctonia*), pythium, caterpillars, thrips, whiteflies, and other pests.

In one embodiment, the invention relates to a plant growing system comprising (a) plant life; (b) a super amount of a controlled-release fertilizer to provide season-long performance; and (c) growing media. In other embodiments, a moisture control agent and/or a plant protection agent are included.

In another embodiment, the invention relates to a high EC plant growing system comprising (a) plant life; (b) a super amount of a controlled-release fertilizer; and (c) growing media; wherein the super amount of a controlled-release fertilizer promotes the high EC in the plant growing system. In other embodiments, a moisture control agent and/or a plant protection agent are included.

In yet another embodiment, the invention relates to a method for promoting season-long performance comprising planting the growing system described herein and enhancing drought tolerance by incorporating a moisture control agent.

In yet another embodiment, the invention relates to a method of increasing drought resistance comprising planting the growing system described herein and watering the plant growing system.

In yet another embodiment, the invention relates to a method of increasing drought resistance comprising planting the growing system described herein and enhancing garden performance by incorporating a pest control agent.

In still another embodiment, the invention relates to a method of growing plants in a high EC environment, where the method comprises planting plant life in a container comprising growing media and a material comprising a super amount of a controlled-release fertilizer.

The patent or application file contains at least one drawing executed in color. Copies of this patent or patent application publication with color drawing(s) will be provided by the U.S. Patent and Trademark Office upon request and payment of the necessary fee.

BRIEF DESCRIPTION OF FIGURES

FIG. 1 is a photograph of five geranium plants grown using four different fertility treatments, where the left-most plant did not receive any fertility treatment.

FIG. 2 is a photograph of four impatiens plants grown using four different fertility treatments.

DETAILED DESCRIPTION OF VARIOUS EMBODIMENTS OF THE INVENTION

Figure 3:
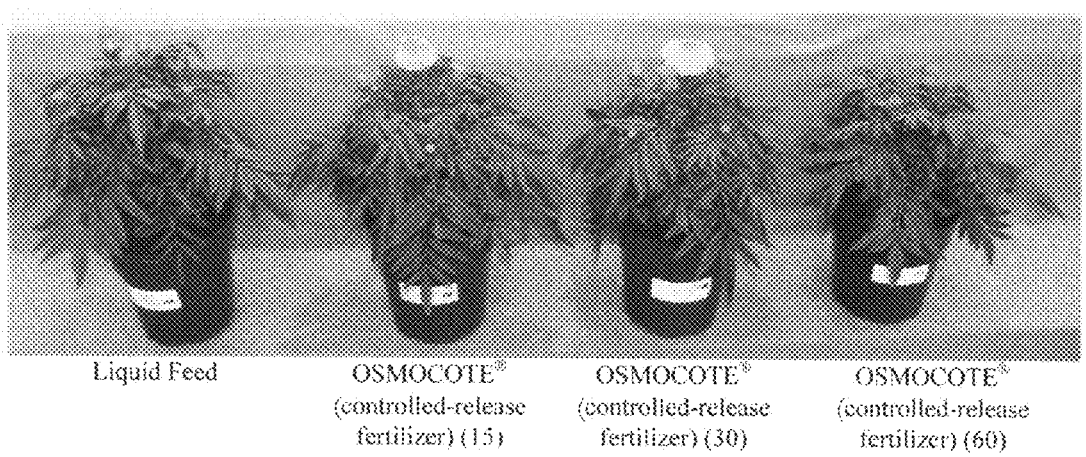
FIG. 3 is a photograph of four petunia plants grown using four different fertility treatments.
Figure 4:
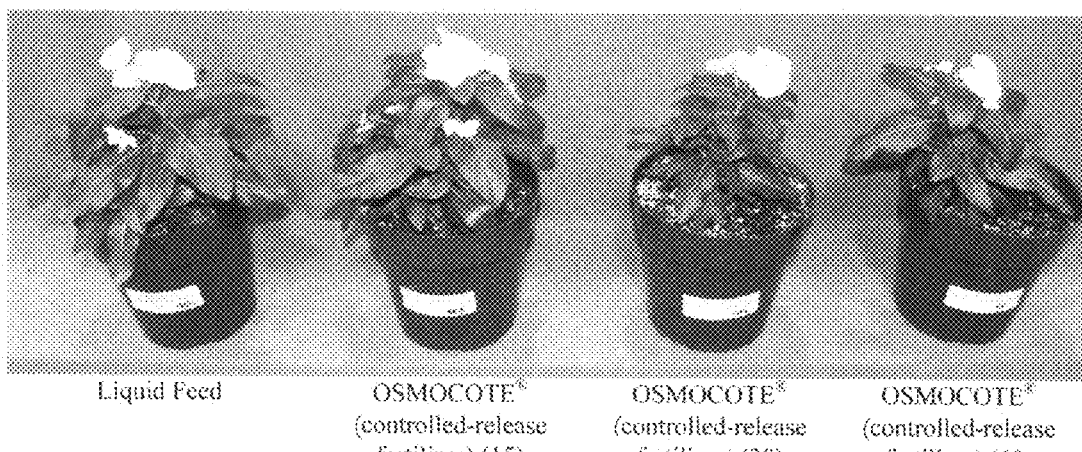
FIG. 4 is a photograph of four marigold plants grown using four different fertility treatments.

Live plants are produced by growers and sold by retailers for consumer use. The goal of the grower and retailer is to obtain a salable plant in a highly cost competitive market. However, many plants on the market lack the additional investments of fertilization, pest protection or moisture mediation. What results are inferior plants that will not exhibit season-long garden performance.

Additionally, current practices and research advise against supplying high amounts of fertilizer. Indeed, negative effects have been observed on post-production performance when high levels of fertilizer are used. See Nell, T. A., et al., *Hort. Science* 24: 996-998 (1989). As such, to "harden" or "tone" plants for shipping and the retail environment, growers will stop fertilization 1-2 weeks prior to shipment. See Nell, supra. This is done to avoid the negative impact (excess growth and stretching) of high EC fertility on plant development and quality, as well as the impact to their budget and the environment. (Conover C. A., Poole R. T., and Steinkamp K. Using the Pour Through Nutrient Extraction Procedure Production Regimes: Optimum Fertilizer Rates and Associated Leachate electrical Conductivity Levels of Twelve Foliage Plants. (http://mrec.ifas.ufl.edu/foliage/resrpts/rh 92 24.htm).

The inventors have developed a system that is counterintuitive to accepted precepts regarding high fertility and ECs and its impact on plant performance during production and dramatically so through the gardening season. In particular, the invention relates to a plant growing system that includes plant life (e.g., plant in small, medium or large plug format; plant cutting, young plant or seed), a super amount of a controlled-release fertilizer (CRF) to provide season-long performance (e.g., in the patio and field), and growing media. A moisture control agent and/or plant protection agent may also be included. The super amounts of CRF used in the invention far exceed the levels of fertilizer previously used. Indeed, the fertility loads used herein, although resulting in high EC, unexpectedly did not detrimentally affect plants, but rather led to superior growth and performance (e.g., in the patio and field) compared to applying standard fertility loads (e.g., applied via constant liquid feed programs that typically contain 150-200 ppm of nitrogen in a complete N—P—K fertilizer with or without minor elements). Accordingly, contrary to conventional wisdom in the art, the inventors surprisingly determined that, among other things, high fertility loads could be used to obtain superior plants at the end of greenhouse/finish production, as well as season-long garden and patio settings.

To protect plant health during distribution and for the end user, the inventors demonstrated that the plant growing systems described herein showed enhanced moisture management that protects against drought stress. Protection from drought stress may be further enhanced by including moisture control agents.

The inventors also surprisingly found that, when adding a combination of controlled-release fertilizers (e.g., a blend of OSMOCOTE® (controlled-release fertilizer) fertilizers), EC was reduced. For example, the inventors showed that the combination of OSMOCOTE® Plus (controlled-release fertilizer) and OSMOCOTE® Mini (controlled-release fertilizer) provided a higher fertility load and a lower EC when compared to the controlled-release fertilizers assessed individually.

The plant growing systems described herein provide an easy and reproducible means for growing plants. The systems include a nutrient supply that adequately provides for both the production and garden performance phases of consumer goods. Indeed, an end user of the plant growing systems will not need to invest the time, money, or labor to ensure optimal garden performance. For example, the plant growing systems will typically not require additional fertilization, while also providing protection from pests and drought—considerations commonly encountered with live plants but not being addressed with plants currently being sold. Accordingly, the invention provides an all-in-one growing system that eliminates the hassle and inconvenience of previously described systems.

In some embodiments, a high EC environment results from the use of a super amount of a controlled-release fertilizer in the system of the embodiments of the present invention. Accordingly, some embodiments of the present invention relate to a method of growing plants in a high EC environment, where the method comprises planting plant life in a pot or container comprising growing media and a material comprising a super amount of a controlled-release fertilizer to provide season-long performance. In other embodiments, the material further comprises a moisture control agent and/or a plant protection agent.

Other embodiments of the present invention relate to a high EC plant growing system comprising (a) plant life; (b) a super amount of a controlled-release fertilizer to provide season-long performance; and (c) growing media; wherein the super amount of a controlled-release fertilizer promotes the high EC in the plant growing system. In other embodiments, the growing system further comprises a moisture control agent and/or a plant protection agent.

A. Definitions

As used herein, the term "super amount of a controlled-release fertilizer" means, in some embodiments, a CRF load greater than 8 kg/m³, e.g., greater than 9 kg/m³; greater than 10 kg/m³; greater than 12 kg/m³; greater than 14 kg/m³; greater than 16 kg/m³; greater than 18 kg/m³; or greater than 20 kg/m³ with pot sizes greater than 10 cm in size. In some embodiments, "super amount of a controlled-release fertilizer" means a CRF load of from about 8 to about 24 kg/m³; about 10 to about 24 kg/m³; or about 12 to about 24 kg/m³.

In other embodiments, the term "super amount of a controlled-release fertilizer" means at least 15 to 60 grams of a controlled-release fertilizer per greater than a 0.8 liter (e.g., greater than 0.9 L, greater than 1 L; greater than 1.25 L; greater than 2 L; or greater than 2.25 L) pot or container For example, in some embodiments, the amounts of fertilizer per greater than 0.8 (or 0.9) liter pot or container is from about 15 to about 30 grams; from about 12 to about 24 grams; from about 10 to about 40 grams; from about 8 to about 32 grams; or from about 14 to about 45 grams of CRF (e.g., OSMO-COTE® Plus 5-6 month 15 Sep. 2012 (controlled-release fertilizer), OSMOCOTE® Plus Hi Start 5-6 month 16 Sep. 2012 (controlled-release fertilizer), Osmocote® Mini 3-4 month 19 Jun. 2010 (controlled-release fertilizer) or combination of OSMOCOTE® Plus (controlled-release fertilizer), and OSMOCOTE® Mini (controlled-release fertilizer)).

In still other embodiments, the term "super amount of a controlled-release fertilizer" means from about 1.5 gram nitrogen to about 9 grams nitrogen per greater than 0.8 (or 0.9) liter pot or container, e.g., from about 2 grams nitrogen to about 5 grams nitrogen; from about 2 to about 4 grams nitrogen; from about 2 to about 8 grams nitrogen; from about 1.5 to about 6 grams nitrogen; of from about 2 to about 9 grams nitrogen per greater than 0.8 (or 0.9) liter pot or container.

As used herein, the term "high EC" means an EC higher than 7 mS/cm as determined via the PourThru method, e.g., higher than 8 mS/cm; higher than 9 mS/cm; higher than 10 mS/cm; higher than 11 mS/cm; higher than 12 mS/cm; higher than 13 mS/cm; higher than 14 mS/cm; or higher than 15 mS/cm as determined via the PourThru method. In some embodiments, the EC is from about 7 mS/cm to about 18 mS/cm, e.g., from about 7 to about 12 mS/cm; from about 9 to about 18 mS/cm; from about 10 to about 18 mS/cm; from about 12 to about 18 mS/cm; from about 12 to about 16 mS/cm; or from about 10 to about 16 mS/cm as determined via the PourThru method.

As used herein, "season-long performance" means plants that maintain growth and production for at least 12-16 weeks. In another embodiment, the season-long performance of a plant may generally refer to plants that are grown in ground or plants that are grown hanging (e.g., in a hanging basket). The performance of a hanging basket, for example, will generally be shorter than that of a plant planted in-ground. Accordingly, "season-long performance" of plants planted and grown in the ground includes growth and production for at least 10-16 weeks. In another embodiment, the season-long performance of plants growing in suspension or hanging includes growth and production for at least 6-14 weeks.

B. Plants

The plant growing system of the invention may comprise a wide variety of plant life such as a plant, plant cutting, young plant or seed. These plants may generally include, for example, flowers, vegetables, fruits, herbs, grass, trees, or perennial plant parts (e.g., bulbs; tubers; roots; crowns; stems; stolons; tillers; shoots; cuttings, including un-rooted cuttings, rooted cuttings, and callus cuttings or callus-generated plantlets; apical meristems etc.). Plant life that may be used in the plant growing system described herein includes plants, plant cuttings, young plants or seeds from ornamental plants such as geranium, petunia, impatiens, verbena, dahlia, pansy, *vinca*, ipomoea, *lantana*, salvia, snapdragon, scaevola, torenia, lobelia, dipladenia, calibrachoa, asters, agerantum, phlox, penstemon, gaillardia, *zinnia*, coleus, osteospermum, gerbera, begonia, angelonia, dianthus, calendula, campanula, celosia, portulaca, *viola*, mums; vegetables such as tomatoes, peppers, broccoli, cucumber, zucchini, raddish, eggplant, cabbage, lettuce, spinach, beet, carrots, spinach, squash, raddish, beans, potato, onion; herbs such as basil, rosemary, dill, cilantro, coriander, thyme, oregano, mint; fruits such as, blueberry, blackberry, raspberry, watermelon, apple, cherry, pear, orange, lemon, and pumpkin; turfgrasses such as bluegrass, St. Augustinegrass, bermudagrass, bentgrass, bahiagrass, centipedegrass, tall fescue, buffalograss, zoysiagrass, ryegrass, fine fescue; and agricultural crops such as corn, sugar cane, wheat, soybean, tobacco, citrus, etc. Without being limited to varieties enumerated herein, the varieties of ornamental plants of the present invention may comprise varieties of the *vinca* genus, such as Cora Cascade Polka Dot, Cora Cascade peach blush, Cora Cascade apricot, Exp. Cora Cascade apricot, Exp. Cora Cascade blush splash, Exp. Cora Cascade shell pink, Exp. Cora Cascade strawberry, Cora Cascade cherry, Exp. Cora Cascade cherry, Cora Cascade magenta, Cora Cascade lilac, Exp. Cora Cascade violet, Exp. Nirvana Cascade white, Exp. Nirvana Cascade polka dot, Nirvana Cascade pink blush, Nirvana Cascade® pink splash, Nirvana Cascade® burgundy, or Nirvana Cascade lavender eye; plants of the *cleome* genus, such as Sparkler F1 blush, Sparkler F1 rose, Sparkler F1 white, Sparkler™ lavender; plants of the *helianthus annuus* genus, such as Exp. Yellow Dark Ct Indeterminant, or Exp. Yellow Dark Ct Indeterminant; plants of the impatients *hawkeri* genus Exp. NGI red, Exp. NGI red, Divine scarlet red, Exp. NGI orange, Divine orange bronze leaf, Exp. NGI salmon, Exp. New Guinea Impatiens salmon, Exp. New Guinea Impatiens salmon, Exp. NGI bicolor orange, Exp. NGI white, Exp. NGI white, Exp. New Guinea Impatiens pink, Divine pink, Exp. NGI violet, Divine violet, Exp. NGI lavender, or Divine lavender; plants of the *lantana* genus, such as Exp. Bandana white, Bandana® primrose, Bandana® peach, Bandana® rose upgrade, Exp. Bandana red, Exp. Bandana cherry, Bandana® orange sunrise, Bandana® trailing gold, or Exp. Bandana trailing red; plants of the *mandevilla hydrida* genus Exp. Rio dark pink, Rio pink, Exp. Rio pink, Rio deep red, Exp. Rio red, or Exp. Rio white; plants of the pelargonium interspecific genus *Calliope* exp. It pk, *Calliope* exp. Coral (bicolor), Exp. *Calliope* hot rose, Exp. *Calliope* rose splash, Exp. *Calliope* burgundy, *Calliope* exp. lav, Exp. *Calliope* lavender rose, *Calliope* exp. ro, *Calliope* exp. Scarlet, *Calliope* Scarlet Fire "Cope Scarfir", Exp. *Calliope* hot scarlet, *Calliope* Dark Red"Ameri Trared", Exp. *Calliope* burgundy, Exp. *Calliope* violet, Exp. *Calliope* burgundy, *Calliope* exp. ro w/Eye, Exp. Caliente® lavender rose, Caliente Pink "Cante Pinka", Caliente exp. Dp.Pk, Exp. Caliente® salmon, Caliente Coral "Cante Coras", Caliente Orange "Cante Oran", Caliente exp. Vio, Caliente exp. Vio, Caliente exp. ro sp, Exp. Caliente® rose coral, or Caliente exp. pkbl; plants of the *pentas lanceolata* genus, such as Exp. Trailing white, Exp. Trailing white, Exp. Trailing white, Exp. Trailing pink bicolor, Exp. Trailing pink bicolor, Exp. Trailing deep pink, Exp. Trailing rose, Exp. Trailing rose, Exp. Trailing cherry, or Exp. Trailing red; plants of the petunia *pendula* genus, such as Plush white, Ramblin' white, Exp. Ramblin yellow, Plush red, Ramblin' red, Plush blue, or Ramblin' nu blue; plants of the *rudbeckia* genus, such as Tiger eye gold F1; plants of the *tagetes erecta* genus, such as Perfection™ yellow, Perfection™ F1 gold, Perfection™ F1 orange, Exp. Perfection Vanilla White, Asian Cut flower, Gold, Asian Cut flower, or Orange, plants of the *viola cornuta* genus, such as Endurio yellow with violet wing, or Exp. Endurio yellow with violet wing; plants of the *viola wittrockiana* genus, such as Exp Colossus Yellow/Blotch VI042, Mammoth Blue-ti-ful, Exp. WonderFall White, Exp. WonderFall Yellow, Exp. WonderFall Yellow Blotch, WonderdFall Yellow with Red Wing trailing, Exp. WonderFall Blue Blotch, WonderFall Blue Picotee Shades, Exp. WonderFall Purple; and plants of the *zinnia* genus, such as ZOWIE!™ YELLOW FLAME, Uproar™ Rose, Uproar™ White 1695-1-T1, Uproar™ Deep Yellow 1695-17-T1, Uproar™ Orange 1695-8-T1, Uproar™ Scarlet 1695-10-T2.

In one embodiment, the plants have superior genetics such as enhanced yields, aesthetics, and garden performance compared to standard, corresponding plants. These plants may be hybrid plants derived from parent plants having superior characteristics, or genetically modified plants comprising foreign nucleic acid molecules and/or endogenous genetic elements that confer desirable traits such as enhanced nutrition or health benefits, superior flavor, brighter or novel colors, greater yields, more fragrance, sterility, modified architecture such as more branching, shorter, taller, deeper rooting, enhanced root branching; attract beneficial pest-control agents; repel undesirable pests; bioremediation; biotic pest tolerance to diseases, nematodes, insects; abiotic stress tolerance such as cold, freezing, heat, drought salt, alkaline.

C. Fertilizers and Nutrients

The plant growing system of the invention comprises a super amount of controlled-release fertilizer (CRF). The CRF may include any coated fertilizer that comprises nitrogen, phorphorus, potassium, and/or micronutrients such as magnesium, sulfur, zinc, iron, copper. The CRF nutrient sources may be derived from urea, ammonium nitrate, ammonium sulfate, diammonium phosphate (DAP), monoammonium phosphate (MAP), calcium phosphate, potassium sulfate, potassium nitrate or combinations or derivatives thereof; and/or secondary nutrients such as calcium, magnesium, sulfur, micronutrients such as iron, copper, zinc, chloride, silica, manganese, boron, molybdenum or combinations thereof. The controlled-release fertilizer may release nutrients over a four, five, six, seven, eight, nine, ten, 11, 12-14, or 16-18 month time period.

The CRFs may include commercially available products such as Nutricote® (controlled-release fertilizer); OSMOCOTE® (controlled-release fertilizer), OSMOCOTE® Plus (controlled-release fertilizer); OSMOCOTE® Plus Hi Start (controlled-release fertilized; OSMOCOTE® Mini (controlled-release fertilizer); OSMOCOTE® Exact (controlled-release fertilizer); Harrell's Polyon® (controlled-release fertilizer) in any array of longevities, NPK content, and physical form (e.g., NPK+Micronutrients); OSMOCOTE® Pro (controlled-release fertilizer); MULTICOTE®; BASACOTE®; PLANTACOTE® NPK, PLANTACOTE® Blends and PLANTACOIE® Pluss; TRIKOTE®; DURATION®; ESN®; NUTRALENE®/isobutyldiurea (IBDU)/NITROFORM® (slow release nitrogen sources to provide slow release nitrogen feeding).

Figure 14:
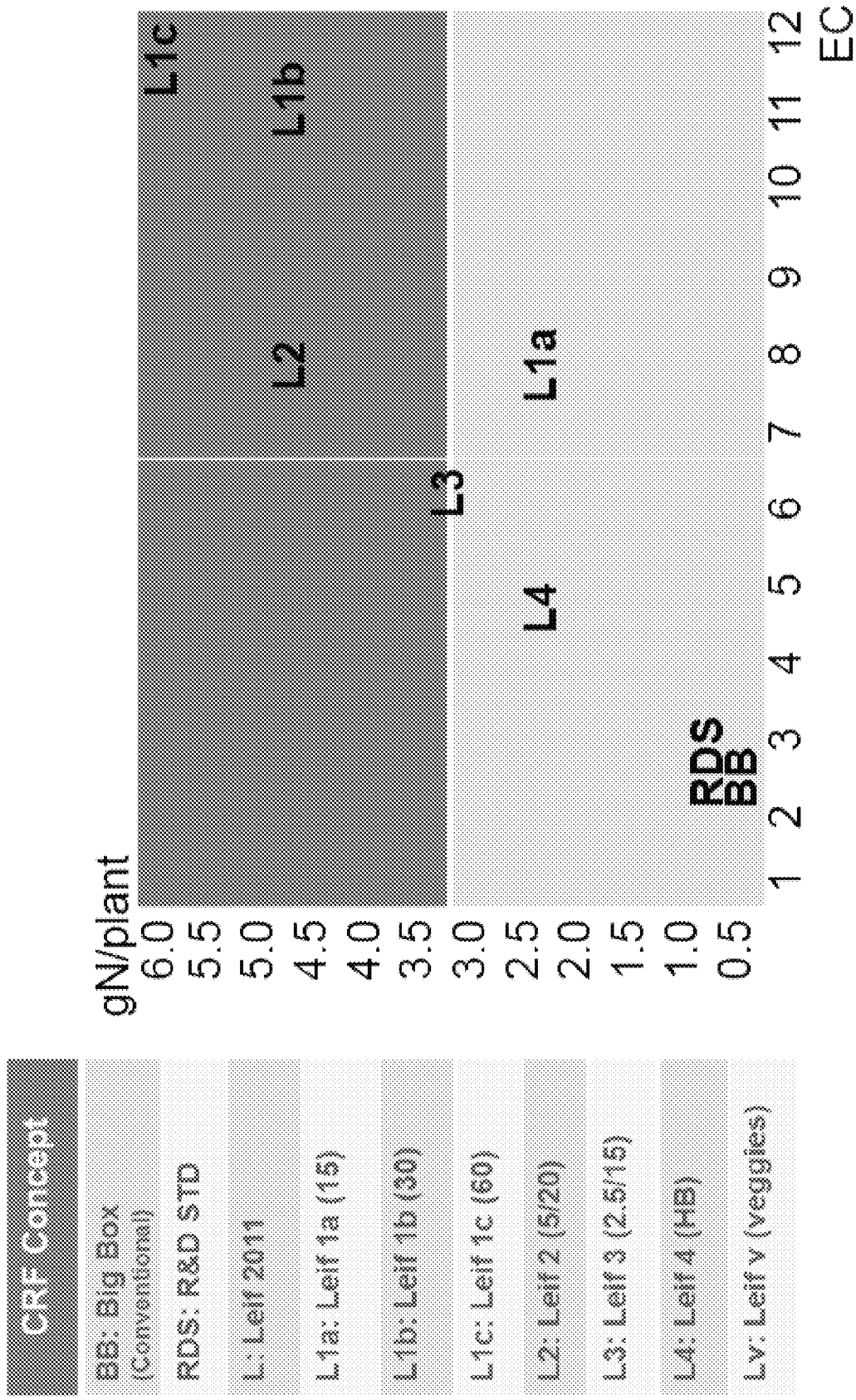
FIG. 14 is a graph showing relative nitrogen amounts and EC values of various fertility formulas.

In some embodiments, the invention provides a combination of CRFs (e.g., a blend of OSMOCOTE® (controlled-release fertilizer) fertilizers). The inventors found, contrary to conventional wisdom, that combining CRFs actually reduced rather than increased EC. This result is demonstrated in FIG. 14. A plot of the EC versus fertility load (gN/plant) showed that as the amount of singular controlled-release fertilizer is increased, the EC also showed an associated increase (see, e.g., L1a to L1c). However, when the controlled-release fertilizers are added in combination (e.g., L2 or L3), an increase in the amount demonstrated higher fertility in gN/plant but a lower EC. Big Box ("BB") are generally grown with 3 times per week of fertigation with 150-200 ppm; R&D Std ("RDS") plants were grown with 3 times per week of fertigation with 150-200 ppm; Leif 1a ("L1a") 15 grams of 5-6 M OSMOCOTE® Plus (15 Sep. 2012) (controlled-release fertilizer); Leif 1b ("L1b") 30 grams of 5-6 M OSMOCOTE® Plus (15 Sep. 2012) (controlled-release fertilizer); Leif 1c ("L1c") 60 grams of 5-6 M OSMOCOTE® Plus (15 Sep. 2012) (controlled-release fertilizer); Leif 2 ("L2") 5 grams of 5-6 M OSMOCOTE® Plus (15 Sep. 2012) (controlled-release fertilizer)+20 grams of 3-4 M OSMOCOTE® Mini (19 Jun. 2010) (controlled-release fertilizer); Leif 3 ("L3") 2.5 grams of 5-6 M OSMOCOTE® Plus (15 Sep. 2012)+15 grams of 3-4 M OSMOCOTE® Mini (19 Jun. 2010) (controlled-release fertilizer); Leif 4 ("L4") 30 grams of 8-9 M OSMOCOTE® Plus (15 Sep. 2012) (controlled-release fertilizer).

In other embodiments, the invention provides that the CRF may be in the form of a fertilizer stick, tablet, spike or other delivery form. Examples of commercially available products include, but are not limited to, OSMOCOTE® Exact Tablets (controlled-release fertilizer), Jobe's® fertilizer spikes, Miracle-Gro® fertilizer spikes.

D. Growing Media

The plant growing system of the invention comprises growing media. The growing media may be any growing media such as peat, perlite, wheat straw, biodigester remains, coir, bark or combinations thereof. In one embodiment, the growing media primarily comprises peat plus perlite in a ratio of 85% peat and 15% perlite. In another embodiment, the media is MetroMix 360 containing formulated Canadian Sphagnum peat moss, coarse perlite, bark ash, starter nutrient charge (with Gypsum) and slow release nitrogen and dolomitic limestone. Other organic matter that could also be utilized wheat straw, wheat-grain-based media, corn stalks, bark, biodigester remains, coir, peat and peat-like materials, wood residues, bagasse, rice hulls, sand, perlite, vermiculite, calcinated clays, expanded polystyrenes, urea formaldehydes, and mixtures thereof.

E. Moisture Control Agents

The plant growing system of the invention comprises a moisture control agent. Moisture control agents assist in preventing over- or under-watering. The moisture control agent includes, but is not limited to, water-swellable/water-absorbable/water-retentive polymers such as cross-linked polymers that swell without dissolving in the presence of water, and may, for example, absorb at least 10, 100, 1000, or more times its weight in water. Such polymers include cross-linked polyacrylamides or cross-linked polyacrylates; carrageenan, agar, alginic acid, guar gums and its derivatives, and gellan gum; products resulting from the grafting of acrylonitrile onto starch; and the like. Specific, non-limiting examples of moisture control agents that can be used in the plant growing system of the embodiments of the present invention, include Aridall® Superabsorbent Polymer (potassium polyacrylate); Aqualon Aquasorb® (sodium carboxymethylcellulose); Stockosorb®; Watersorb®; Zeba®; lignins, alkyl polyglucosides (APGs); and the like and combinations thereof.

F. Plant Protection Agent

The plant growing system of the invention comprises a plant protection agent. The plant protection agent may be acaricides, algicides, antifeedants, avicides, bactericides, bird repellents, chemosterilants, herbicide safeners, insect attractants, insect repellents, insecticides, mammal repellents, mating disruptors, miticides, molluscicides, nematicides, plant activators, plant-growth regulators, rodenticides, synergists, virucides or mixtures thereof. In one embodiment, the plant protection agent is controlled/timed-release.

The plant protection agents may include commercially available products such as BARRICADE® (herbicide), DEPARTURE® (herbicide), FUSILADE® (herbicide), Foestyl-Al®, MONUMENT® (herbicide), PENNANT MAGNUM® (herbicide), PRINCEP® (herbicide), REFUGE® (herbicide), REWARD® (herbicide), TENACITY® (herbicide), BANNER MAXX® (herbicide), CONCERT® (herbicide), DACONIL® (fungicide), HEADWAY® (herbicide), HERITAGE® (fungicide), HURRICANE® (fungicide) INSTRATA® (fungicide), MEDALLION® (fungicide), MICORA® (fungicide), PALLADIUM® (fungicide), RENOWN® (fungicide), SUBDUE MAXX® (fungicide), AVID® (fungicide), AWARD® (insecticide), CITATION® (insecticide), ENDEAVOR® (insecticide), FLAGSHIP® (insecticide), MERIDIAN® (insecticide), SCIMITAR® (insecticide), BONZI® (herbicide), MAXX® (herbicide), TRIMMIT® (herbicide), CYAZYPYE® (insecticide) or CORAGEN® (insecticide) and the like or mixtures thereof. In another embodiment, the plant protection agent is an insecticide such as but not limited to. In another embodiment, the plant protection agent is phosphite or Fosetyl-Al enscapsulated with OSMOCOTE® (controlled release fertilizer) resin using and N-P-K core that acts as the Osmotic Pump to drive release of the fungicide to control Pythium, Phytophtora, and Downy Mildew.

G. Biodegradable Pot or Container

The plant growing system may comprise a biodegradable pot or container. The pot or container may be at least 0.8 L (e.g., greater than 0.9 L, greater than 1 L; greater than 1.25 L; greater than 2 L; or greater than 2.25 L). In some embodiments, the pot or container can be from about 0.9 L to about 2.25 L, e.g., from about 0.9 L to about 2 L, from about 1 L to about 2.25 L, from about 1 L to 2 L or from about 1.25 L to about 2.25 L.

The biodegradable pot or container provides a protective housing unit for the components of the plant growing systems described herein (e.g., plant, super amount of controlled-release fertilizer, etc.). As such, the biodegradable pot or container must be sufficiently rigid and also biodegradable to allow for production and shipment to end-users. The biodegradable pots also support the sustainable and earthy nature of gardening by often using renewable resources such as cow manure, wood fibers or peat.

The biodegradable pot or container may comprise a molded material, a formed material, a composted material, a shaped material, or combinations thereof. For example, the material may be peat, wheat straw, coconut fiber, manure (e.g., cow, bull, horse), paper pulp, brown or white sugarcane fibers, coir, or combinations thereof, and may be molded, for example, into an 0.9 liter or larger sized pot or container.

Biodegradable pots are also superior growing containers because of the impact on root development. Indeed, biodegradable pots permit the roots to grow through the container enabling quicker and better root development into the surrounding soil upon transplanting.

It is understood that pots or containers made of other materials (e.g., plastic) may also be used with the embodiments described herein.

H. Methods of Using the Plant Growing System

Methods of using the plant growing systems are contemplated herein. In one embodiment, the invention provides for a method of growing a plant comprising planting the plant growing system described herein and watering said plant growing system. In another embodiment, the invention provides for a method of planting comprising pushing the plant growing system described herein into a surface, and watering the inserted plant growing system. In another embodiment, the method of planting requires preparing a surface adapted to receive the plant growing system described herein, where the system leads to superior growth due to enhanced fertility, protection from moisture stress and plant pests such as insects and diseases. In another embodiment, the invention provides for a method of growing a plant in an environment having a high EC.

In another embodiment, the invention provides for a method of increasing the drought resistance of a plant comprising planting the plant utilizing the plant growing system described herein. In another embodiment, the plant growing system may further comprise a moisture control agent described herein. For example, the plant growing system may include, but not limited to, the moisture controlling agents described in paragraph [0050] above. In an alternative embodiment, a planting growing system that further comprises a moisture controlling agent may additionally comprise a plant protection agent. The plant protecting agent may include, but is not limited to, the plant protecting agents described in paragraph [0051]-[0052] above.

The following examples are not intended to limit the invention in anyway.

EXAMPLES

A. Example 1

The plant growing system of the embodiments of the present invention permits the production of healthy, commercial salable plants as demonstrated below.

Five annual garden plants, namely, Calliope dark red geranium, Accent premium white impatiens, Ramblin Nu Blu petunia, Moonstruck yellow marigold, and Cora white vinca were all grown in a plant growing system containing Fafard Growing Mix F-15, 1.5 grams Stockosorb, and four different fertility treatments. The standard treatment involved adding liquid fertilization (constant liquid feed; no clear water) three times per week at a rate of 150 ppm nitrogen. The other three treatments involved the use of 15 grams, 30 grams or 60 grams of 5-6 M OSMOCOTE® Plus (15 Sep. 2012) controlled-release fertilizer per 1.5 L pot. The plants were grown as 72 cell-pack plugs in eight replications under standard greenhouse conditions. The pH, EC, height, growth index, flower count, and overall plant quality were measured as shown below in Tables 1-5 for Geranium, Impatiens, Petunia, Marigold, and Vinca. The pH and EC were measured seven and 21 days after planting (DAP), whereas the height, growth index (measured by height+diameter in axis 1+diameter in axis 2 divided by 3), flower count, and overall plant quality were each measured five weeks after planting (WAP).

FIG. 1 shows each of the geranium plants, where the leftmost plant was unfertilized; the plant to its right was grown using the standard system; and the other plants grown using the 15, 30, and 60 gram treatments appearing to the right, respectively. FIGS. 2-5 show each of the impatiens, petunia, marigold, and *vinca* plants, respectively, where the left-most plant was grown using the standard treatment and the plants grown using the 15, 30, and 60 gram treatments appearing to the right, respectively.

Overall, the data presented in Tables 1-5 demonstrate that superior performing plants can be grown in the plant growing system of the embodiments of the present invention even at very high ECs. For example, at 21 days after planting, geraniums grown with the 60 gram fertility treatment had an EC of 17.5 mS/cm (PourThru extraction method). Nevertheless, five weeks after planting, the flower count and overall plant quality was higher than plants grown using the standard treatment.

Dramatically, and unexpectedly, geraniums grown with 60 grams of 5-6 M OSMOCOTE® Plus (controlled-release fertilizer) demonstrated higher plant quality and bloom count than plants undergoing standard liquid fertilization in spite of having an EC at 21 days after planting of 17.5 mS/cm (Table 1). Impatiens grown with 15 and 30 grams of 5-6 M OSMOCOTE® Plus also showed superior or comparable plant quality to controls, even though the EC value for 30 gram OSMOCOTE® (controlled-release fertilizer) treatment was 11.2 mS/cm, 21 days after planting (Table 2). Superior plant quality was also seen with petunia even plants grown in 60 grams of 5-6 M OSMOCOTE® Plus (controlled-release fertilizer) that had an EC value at 21 days after planting of 17.5 mS/cm (Table 3). Marigolds grown at 60 grams of 5-6 month OSMO-COTE® Plus (controlled-release fertilizer) had commercial level plant quality in spite of an EC value of 18.2 mS/cm 21 days after planting (Table 4). Plants produced in the growing system often have such enhanced desirable, horticultural characteristics as dark green leaf color, better lateral branch development, and a more favorable mounding habit.

TABLE 1

Geranium (numbers in parentheses indicate standard deviation)

| Treatment | pH | | EC (mS/cm) (Pour thru) | | Height (cm) | Growth Index $(H + D1 + D2)/3$ | Flower Count | Plant Quality $(5 > 1)$ |
|---|---|---|---|---|---|---|---|---|
| | 7 DAP | 21 DAP | 7 DAP | 21 DAP | 5 WAP | 5 WAP | 5 WAP | 5 WAP |
| Standard | 5.1 (0.03) | 5.6 (5.6) | 3.0 (0.3) | 2.3 (0.17) | 14.4 (2.4) | 26.0 (2.6) | 1.3 (0.7) | 3.3 (0.9) |
| 15 grams | 5.1 (0.03) | 4.9 (0.06) | 7.2 (0.6) | 7.7 (0.97) | 13.5 (1.7) | 22.1 (2.6) | 1.3 (0.5) | 3.5 (0.5) |
| 30 grams | 5.4 (0.07) | 4.7 (0.17) | 8.2 (1.5) | 9.8 (2.2) | 12.6 (2.0) | 21.3 (2.0) | 1.1 (0.8) | 3.8 (0.9) |
| 60 grams | 5.4 (0.08) | 5.0 (0.06) | 8.2 (1.5) | 17.5 (2.4) | 11.4 (1.9) | 19.5 (3.1) | 1.8 (0.7) | 4.3 (1.0) |

TABLE 2

Impatiens (numbers in parentheses indicate standard deviation)

| Treatment | pH | | EC (mS/cm) (Pour thru) | | Height (cm) | Growth Index $(H + D1 + D2)/3$ | Flower Count | Plant Quality $(5 > 1)$ |
|---|---|---|---|---|---|---|---|---|
| | 7 DAP | 21 DAP | 7 DAP | 21 DAP | 5 WAP | 5 WAP | 5 WAP | 5 WAP |
| Standard | 5.3 (0.03) | 6.0 (0.05) | 3.5 (0.5) | 2.3 (0.19) | 11.6 (1.2) | 26.4 (1.6) | 28.3 (6.6) | 3.6 (0.7) |
| 15 grams | 4.9 (0.06) | 5.6 (0.09) | 9.4 (0.4) | 7.3 (1.7) | 10.6 (1.3) | 22.5 (2.5) | 19.5 (7.6) | 4.0 (0.9) |
| 30 grams | 4.9 (0.02) | 5.5 (0.05) | 12.1 (0.8) | 11.2 (1.4) | 10.6 (1.4) | 21.7 (2.3) | 18.1 (5.2) | 3.6 (0.9) |
| 60 grams | 5.0 (0.06) | 5.4 (0.07) | 13.8 (2.5) | 16.2 (2.1) | 8.8 (1.8) | 17.4 (2.7) | 16.3 (8.4) | 2.4 (0.5) |

TABLE 3

Petunia (numbers in parentheses indicate standard deviation)

| Treatment | pH | | EC (mS/cm) (Pour thru) | | Height (cm) | Growth Index $(H + D1 + D2)/3$ | Flower Count | Plant Quality $(5 > 1)$ |
|---|---|---|---|---|---|---|---|---|
| | 7 DAP | 21 DAP | 7 DAP | 21 DAP | 5 WAP | 5 WAP | 5 WAP | 5 WAP |
| Standard | 5.2 (0.05) | 6.1 (0.05) | 3.2 (0.3) | 2.1 (0.1) | 24.0 (3.6) | 43.5 (5.0) | 14.4 (7.2) | 2.4 (0.7) |
| 15 grams | 5.1 (0.02) | 6.0 (0.09) | 6.8 (0.7) | 3.1 (0.7) | 21.8 (3.0) | 41.5 (3.2) | 13.0 (4.0) | 2.5 (0.5) |
| 30 grams | 4.9 (0.00) | 5.6 (0.11) | 12.7 (0.9) | 7.0 (1.6) | 20.5 (3.2) | 42.8 (5.8) | 10.6 (5.9) | 3.1 (0.8) |

TABLE 3-continued

Petunia (numbers in parentheses indicate standard deviation)

| | pH | | EC (mS/cm) (Pour thru) | | Height (cm) | Growth Index (H + D1 + D2)/3 | Flower Count | Plant Quality (5 > 1) |
|---|---|---|---|---|---|---|---|---|
| Treatment | 7 DAP | 21 DAP | 7 DAP | 21 DAP | 5 WAP | 5 WAP | 5 WAP | 5 WAP |
| 60 grams | 4.9 (0.04) | 5.6 (0.14) | 14.2 (1.3) | 11.8 (3.5) | 21.4 (2.1) | 40.0 (4.2) | 11.1 (3.9) | 2.8 (0.7) |

TABLE 4

Marigold (numbers in parentheses indicate standard deviation)

| | pH | | EC (mS/cm) (Pour thru) | | Height (cm) | Growth Index (H + D1 + D2)/3 | Flower Count | Plant Quality (5 > 1) |
|---|---|---|---|---|---|---|---|---|
| Treatment | 7 DAP | 21 DAP | 7 DAP | 21 DAP | 5 WAP | 5 WAP | 5 WAP | 5 WAP |
| Standard | 6.2 (0.03) | 6.4 (0.04) | 3.7 (0.4) | 3.4 (0.5) | 21.4 (1.4) | 28.8 (1.4) | 1.3 (1.0) | 5.0 (0.0) |
| 15 grams | 6.0 (0.05) | 5.5 (0.07) | 5.5 (0.6) | 8.0 (0.7) | 20.9 (2.0) | 29.5 (2.6) | 1.3 (0.9) | 5.0 (0.0) |
| 30 grams | 6.1 (0.03) | 5.5 (0.11) | 73 (0.7) | 11.0 (0.5) | 20.0 (1.5) | 28.1 (3.3) | 1.9 (1.0) | 4.9 (0.6) |
| 60 grams | 5.9 (0.09) | 5.5 (0.06) | 10.7 (2.3) | 18.4 (2.4) | 19.0 (0.5) | 26.3 (1.6) | 1.5 (0.8) | 4.4 (0.5) |

TABLE 5

Vinca (numbers in parentheses indicate standard deviation)

| | pH | | EC (mS/cm) (Pour thru) | | Height (cm) | Growth Index (H + D1 + D2)/3 | Flower Count | Plant Quality (5 > 1) |
|---|---|---|---|---|---|---|---|---|
| Treatment | 7 DAP | 21 DAP | 7 DAP | 21 DAP | 5 WAP | 5 WAP | 5 WAP | 5 WAP |
| Standard | 5.7 (0.04) | 5.9 (0.09) | 2.8 (0.4) | 2.0 (0.3) | 14.1 (1.2) | 17.8 (0.7) | 3.3 (0.9) | 3.6 (0.5) |
| 15 grams | 5.2 (0.07) | 5.7 (0.09) | 9.3 (1.0) | 3.4 (0.6) | 13.6 (1.6) | 16.5 (2.4) | 3.8 (0.5) | 3.5 (1.1) |
| 30 grams | 5.2 (0.12) | 5.5 (0.07) | 12.5 (2.8) | 8.0 (1.2) | 11.9 (2.3) | 14.4 (3.6) | 2.9 (0.6) | 2.8 (0.9) |
| 60 grams | 5.0 (0.15) | 5.4 (0.05) | 15.8 (1.9) | 12.6 (2.4 | 11.4 (1.9) | 14.1 (2.5) | 2.9 (0.8) | 2.3 (0.5) |

B. Example 2

Impatiens were grown in ten different growing systems, none of which contained a CRF, but contained, in some cases, the moisture control agents listed below:
  (a) Manitoba Peat;
  (b) Manitoba Peat and X6 wetting agent (1200 ppm);
  (c) Fafard Growing Mix F-15 and X6 wetting agent (1200 ppm);
  (d) Fafard Growing Mix F-15 and Zeba® (2 lbs./yd³);
  (e) Fafard Growing Mix F-15 and Stockosorb® (2 lbs./yd³);
  (f) Fafard Growing Mix F-15, Stockosorb® (2 lbs./yd³), and Aq200 wetting agent (1200 ppm);
  (g) Fafard Growing Mix F-15 and Stepsperse® (0.5% by wt.);
  (h) Fafard Growing Mix F-15 and Stepsperse® (1% by wt.);
  (i) Fafard Growing Mix F-15 and Zaplock® (1 lb./yd³); and
  (j) Fafard Growing Mix F-15 and Zaplock® (2 lbs./yd³).

Figures 5, 8:
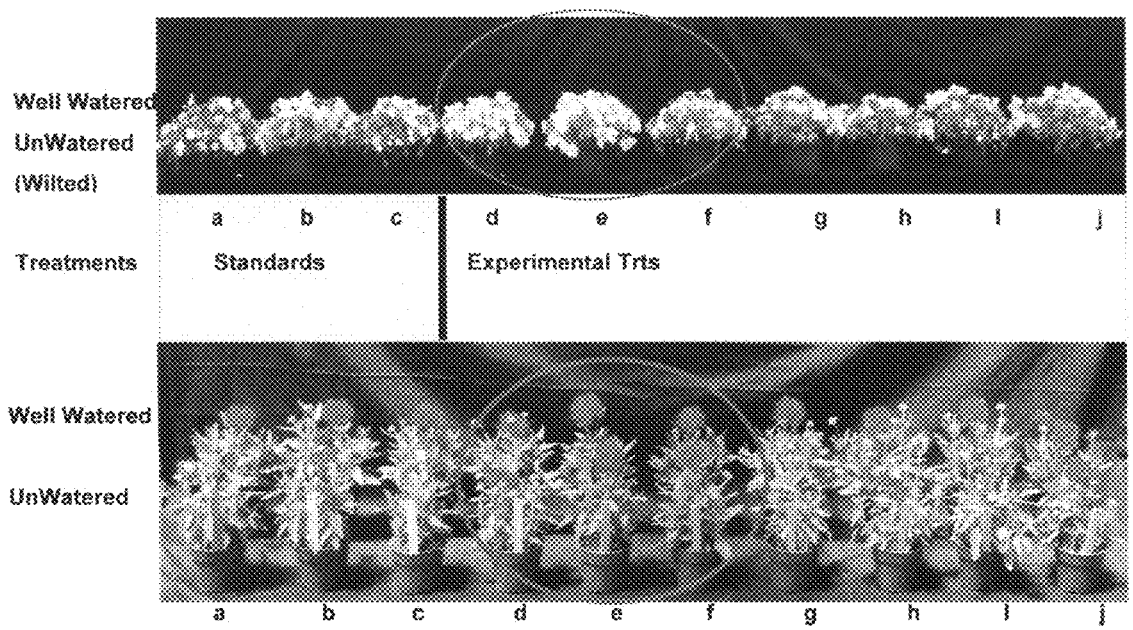
FIG. 5 is a photograph of four *vinca* plants grown using four different fertility treatments.
FIG. 8 is a picture of impatiens (upper rows) and verbena (lower rows) plants grown in media containing various moisture control agents.
Figure 6:
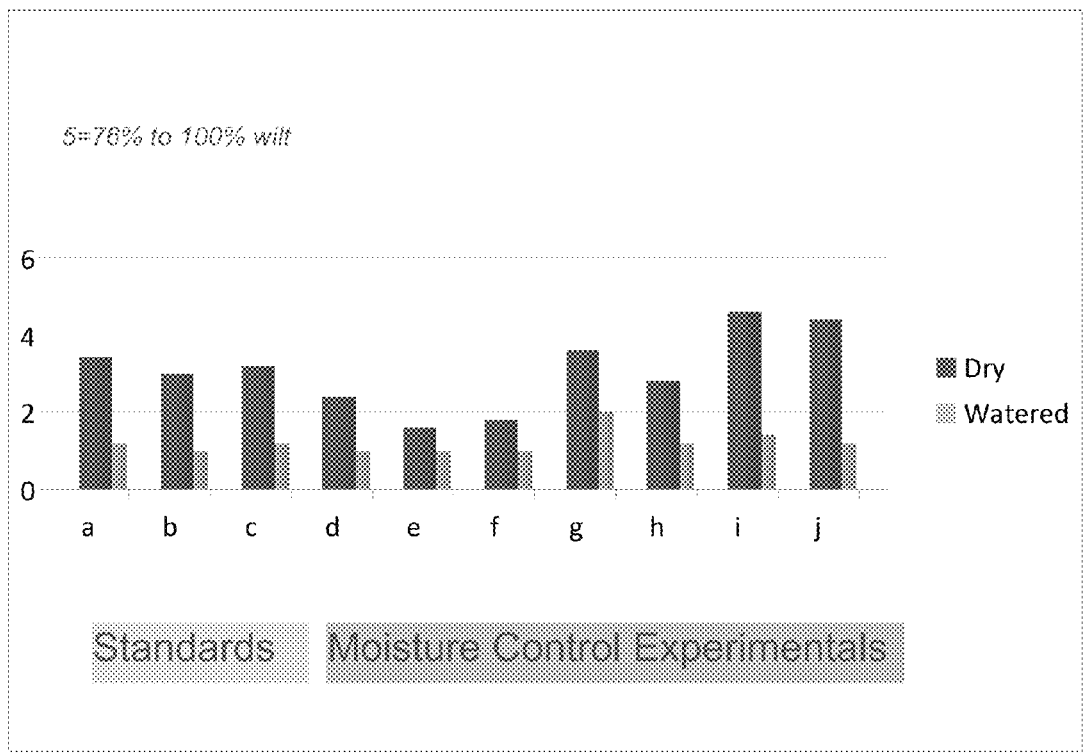
FIG. 6 is a graph of experiments where various moisture control agents were used and the percent wilt was measured after an 11-day dry-down period.
Figure 7:
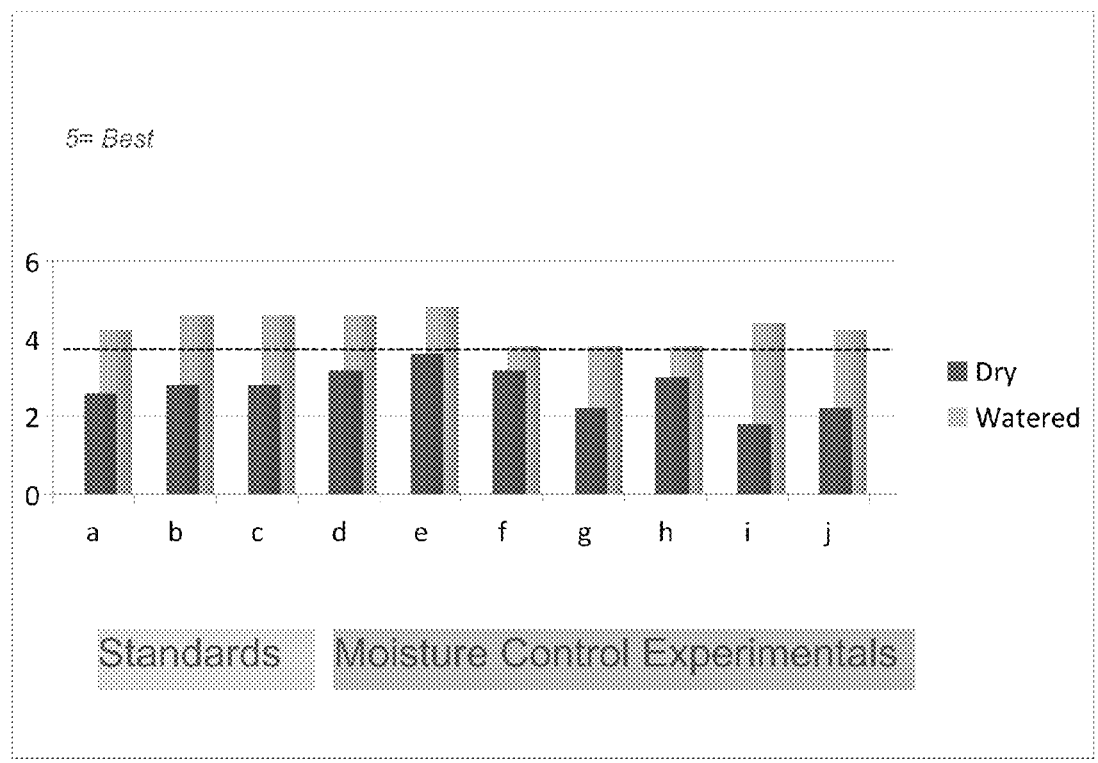
FIG. 7 is a graph of experiments where various moisture control agents were used and the visual quality at wilt was measured after an 11-day dry-down period.

The plants were grown as 288 cell-pack plugs in eight replications under standard greenhouse conditions. The plants were subsequently transplanted into 4 and 8 inch pots and the 8 inch pot data is presented in this example. Each plant received liquid fertilization (constant liquid feed; no clear water) three times per week at a rate of 200 ppm nitrogen. After an 11 day period over which one set of plants was kept watered using constant liquid feed and another set of plants was allowed to dry down, those plants containing the Stockosorb® treatment (i.e., e and f) showed the least variance in percent wilt between watered and dry-down, as shown in FIG. 6. This demonstrates that the Stockosorb® treatment resulted in the best water retention. The same plants exhibited the least variance in visual quality at wilt between watered and dry-down, as shown in FIG. 7. FIG. 8 shows a side-by-side comparison between impatiens grown in the various media described above. The plants in the lower row are verbena.

C. Example 3

Figure 9:
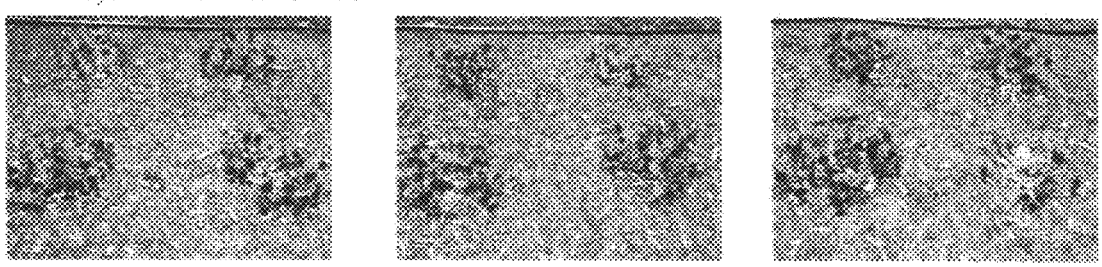
FIG. 9 shows pictures of petunia plants grown in the presence and absence of plant protection agents.
Figure 9:
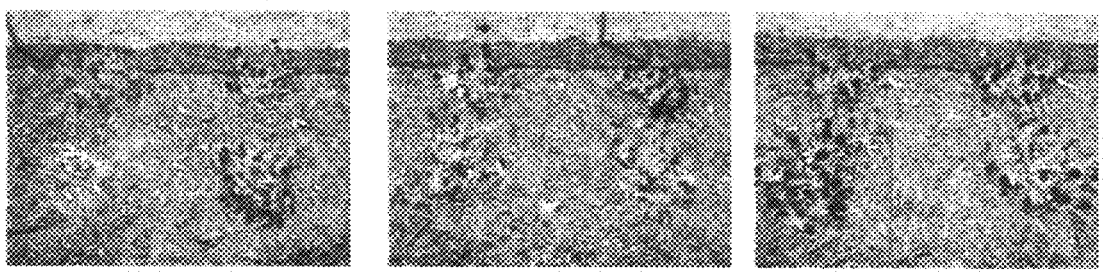

Petunia plants were grown in 4 inch pots containing Fafard Growing Mix F-15, 10 grams of 8-9 M OSMOCOTE® Pro (17 May 2011) (controlled-release fertilizer), and 2 grams Stockosorb® under standard greenhouse conditions. One week prior to the plants filling the pot and being retail ready for commercial sale, the plants were treated with Heritage® and Subdue® fungicides and Flagship® insecticide. The plants were treated with a drench containing Heritage® 0.5 oz./100 gal.; Subdue® 1.0 oz./100 gal.; and Flagship 4 oz./100 gal. FIG. 9 shows a higher rate of disease pressure on the untreated controls than the plants grown using the growing systems according to the embodiments of the present invention.

D. Example 4

Figure 10:
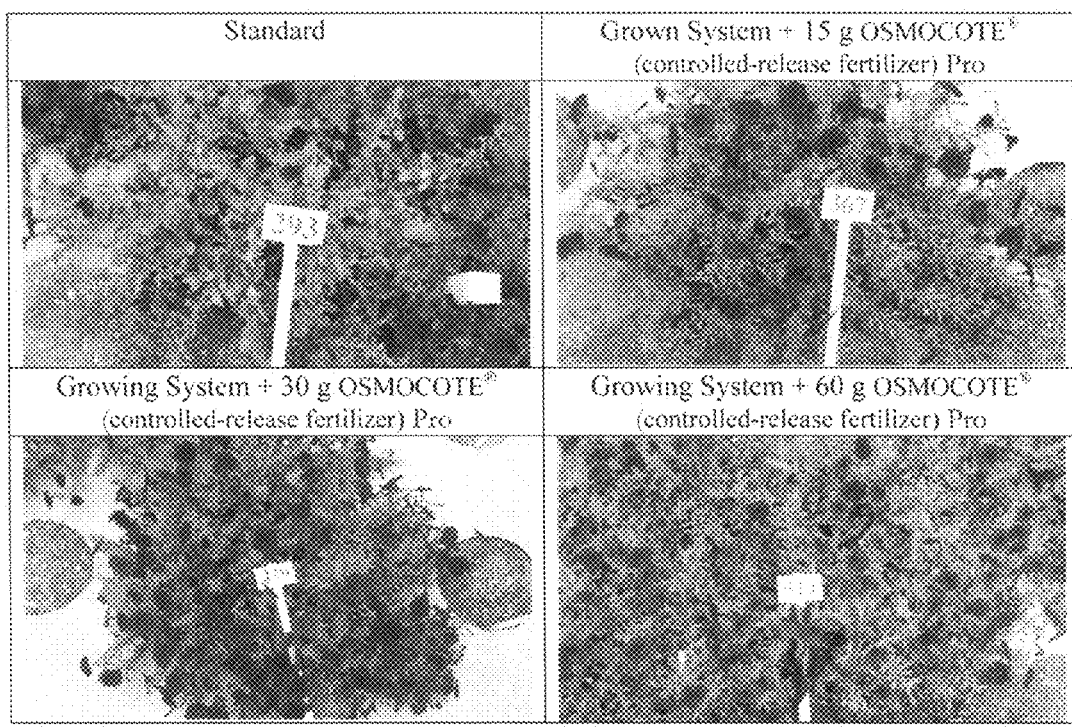
FIG. 10 shows pictures of petunia plants grown using four different fertility treatments.

Petunia plants were grown in 6 inch pots containing Fafard Growing Mix F-15; 15, 30 or 60 grams of 5-6 M OSMOCOTE® Plus (15 Sep. 2012) (controlled-release fertilizer); and 1 gram Stockosorb® under standard greenhouse conditions. One week prior to the plants filling the pot and being retail ready for commercial sale, the plants were treated with Heritage® and Subdue® fungicides and Flagship® insecticide. The plants were treated with a drench containing Heritage® 0.5 oz./100 gal.; Subdue® 1.0 oz./100 gal.; and Flagship® 4 oz./100 gal. FIG. 10 shows inferior garden performance of untreated controls (Standard) than for plants grown using the growing systems of the embodiments of the invention (Growing System+15 g CRF, 30 g CRF and 60 g CRF) after 12 weeks in the garden.

Figure 11:
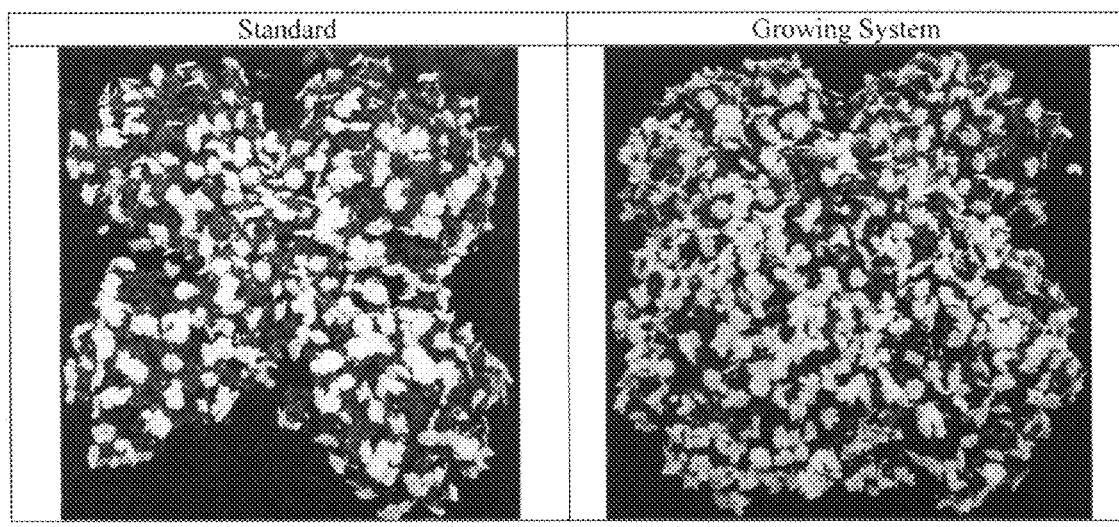
FIG. 11 shows pictures of impatiens plants grown using two different fertility treatments.

Also, Impatiens plants were grown in 4 inch pots containing Fafard Growing Mix F-15, 10 grams of 8-9 M OSMOCOTE® Pro (17 May 2011) (controlled-release fertilizer), and 2 grams Stockosorb® under standard greenhouse conditions. One week prior to the plants filling the pot and being retail ready for commercial sale, the plants were treated with Heritage® and Subdue® fungicides and Flagship® insecticide. The plants were treated with a drench containing Heritage® 0.5 oz./100 gal.; Subdue® 1.0 oz./100 gal.; and Flagship® 4 oz./100 gal. FIG. 11 shows inferior garden performance of untreated controls (Standard) than for plants grown using the growing systems according to the embodiments of the present invention after 14 weeks in the garden.

E. Example 5

The plant growing system of the embodiments of the present invention permits not only the production of healthy, commercial salable plants, but also plants that are better able to tolerate drought stress. The benefits of drought protection can be further increased by incorporating a moisture control agent.

Figure 12:
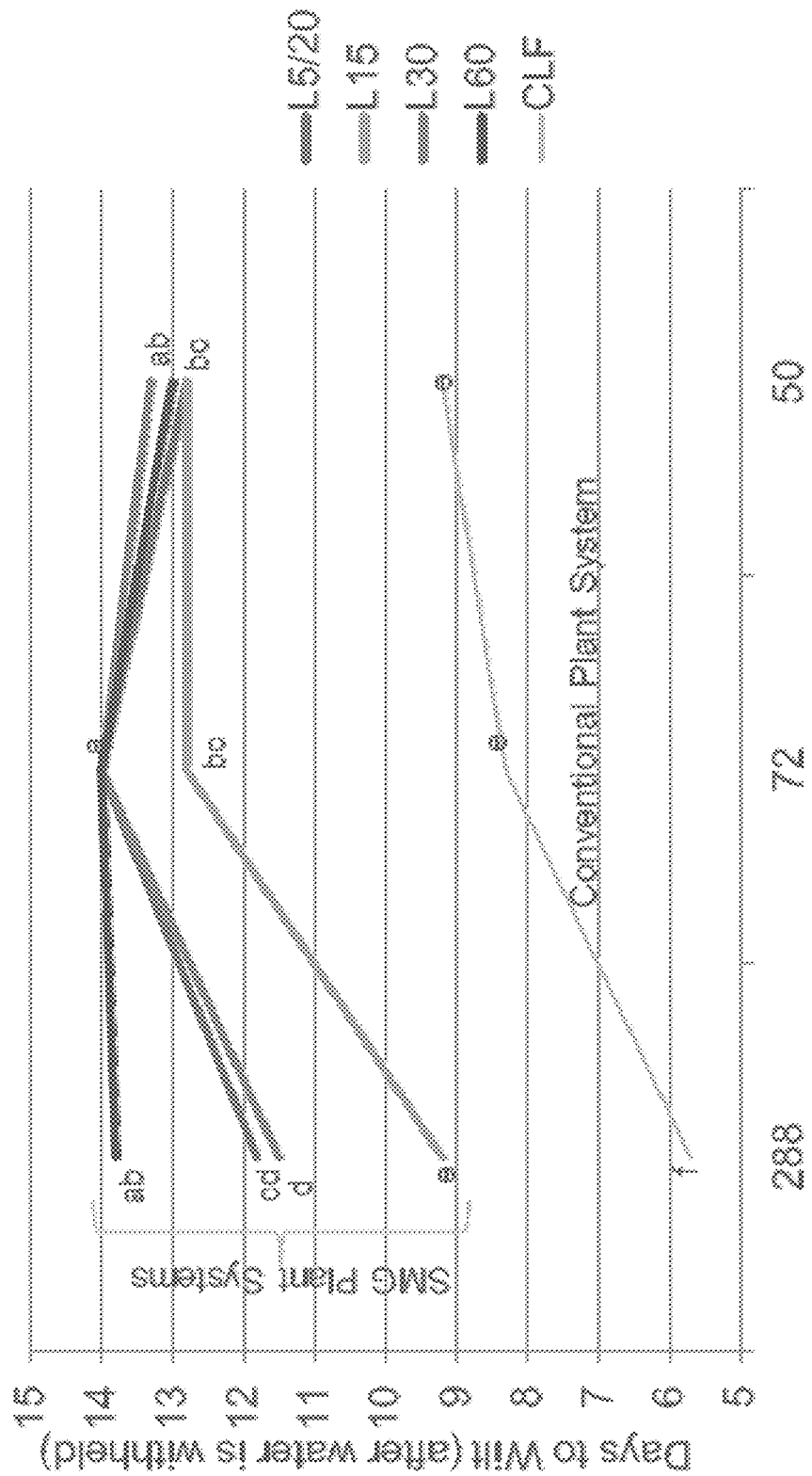
FIG. 12 is a graph of a drought stress study with impatiens using five different fertility treatments.

Accent premium white impatiens were all grown in a plant growing system containing Fafard Growing Mix F-15, 1.5 and five different fertility treatments. The standard treatment involved adding liquid fertilization (constant liquid feed; no clear water) three times per week at a rate of 150 ppm nitrogen. The other four treatments involved the use of 15 grams, 30 grams or 60 grams of 5-6 M OSMOCOTE® Plus (15 Sep. 2012) controlled-release fertilizer per 1.3 L pot, and 5 grams of 5-6 M OSMOCOTE® Plus (15 Sep. 2012) (controlled-release fertilizer)+20 grams of 3-4 M OSMOCOTE® Mini (19 Jun. 2010) controlled-release fertilizer per 1.3 L pot. The plants were grown in 50, 72 or 288 cell-pack plugs in six replications under standard greenhouse conditions. When plants reached pot fill, they were heavily watered and did not receive any additional watering. The plants were scored daily and days to 75% wilt were recorded. FIG. 12 shows plants produced using the growing system show a dramatic improvement in drought tolerance.

Figure 13:
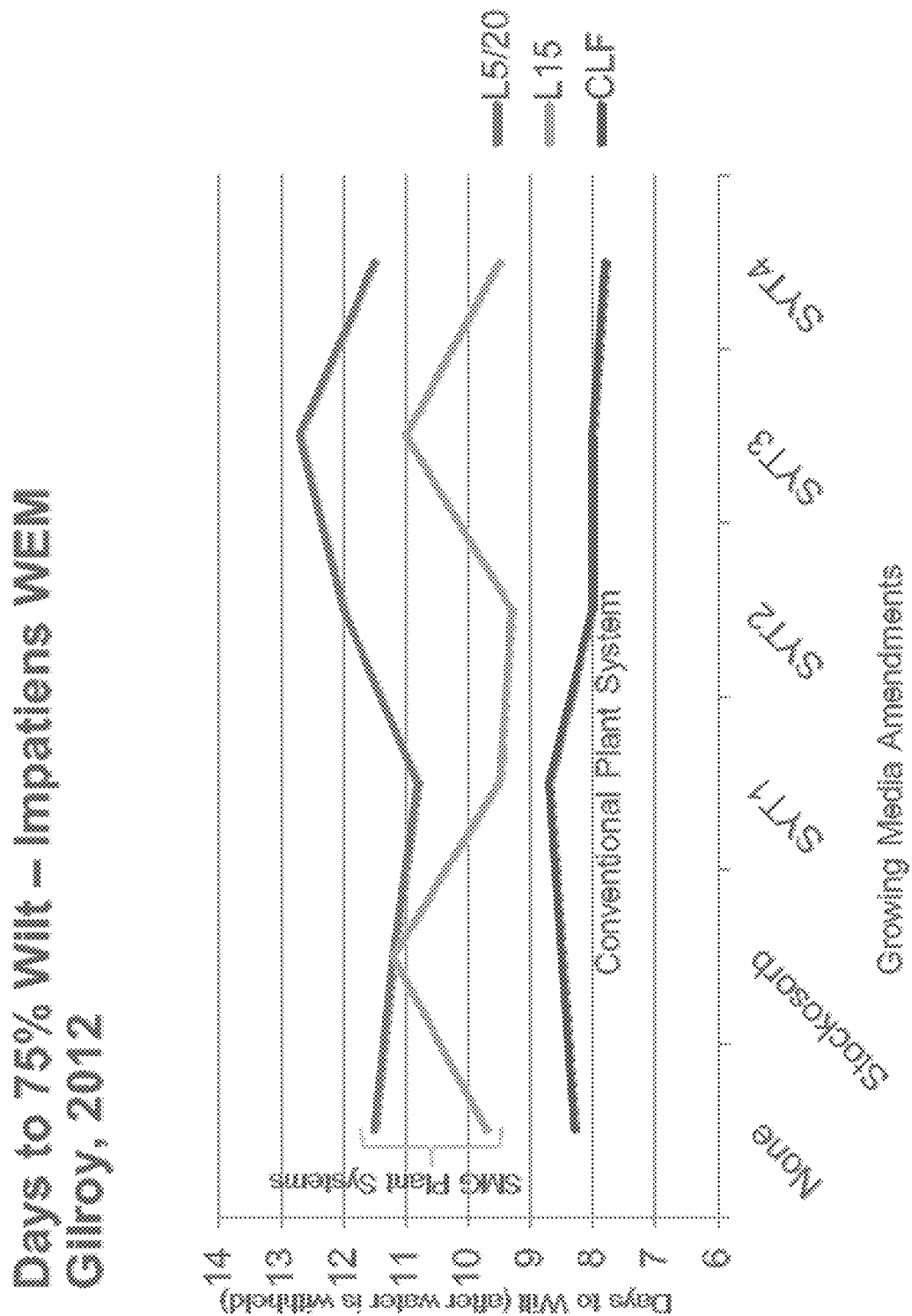
FIG. 13 is a graph of a drought stress study with impatiens that incorporates moisture control agents.

Accent premium white impatiens were all grown in a plant growing system containing Fafard Growing Mix F-15 and three different fertility treatments. The standard treatment involved adding liquid fertilization (constant liquid feed; no clear water) three times per week at a rate of 150 ppm nitrogen. The other two treatments involved the use of 15 grams of 5-6 M OSMOCOTE® Plus (15 Sep. 2012) controlled-release fertilizer per 1.3 L pot, and 5 grams of 5-6 M OSMOCOTE® Plus (15 Sep. 2012) (controlled-release fertilizer)+20 grams of 3-4 M OSMOCOTE® Mini (19 Jun. 2010) controlled-release fertilizer per 1.3 L pot. In addition to non-amended control and Stockosorb at 1.5 mg per pot; Active, SYT1 (guar gum 1) at 1 gram per pot, Active, SYT2 (guar gum 2) at 1 gram per pot, Active, SYT3 (guar gum 3) at 1 gram per pot, Active, SYT4 (APG) at 0.2% solution per pot were incorporated into the media. The plants were grown in 72 cell-pack plugs in eight replications under standard greenhouse conditions. When plants reached pot fill, they were heavily watered and did not receive any additional watering. The plants were scored daily and days to 75% wilt were recorded. FIG. 13 shows plants produced using the growing system that includes SYT3 further increased protection from drought stress.

F. Example 6

Figure 15:
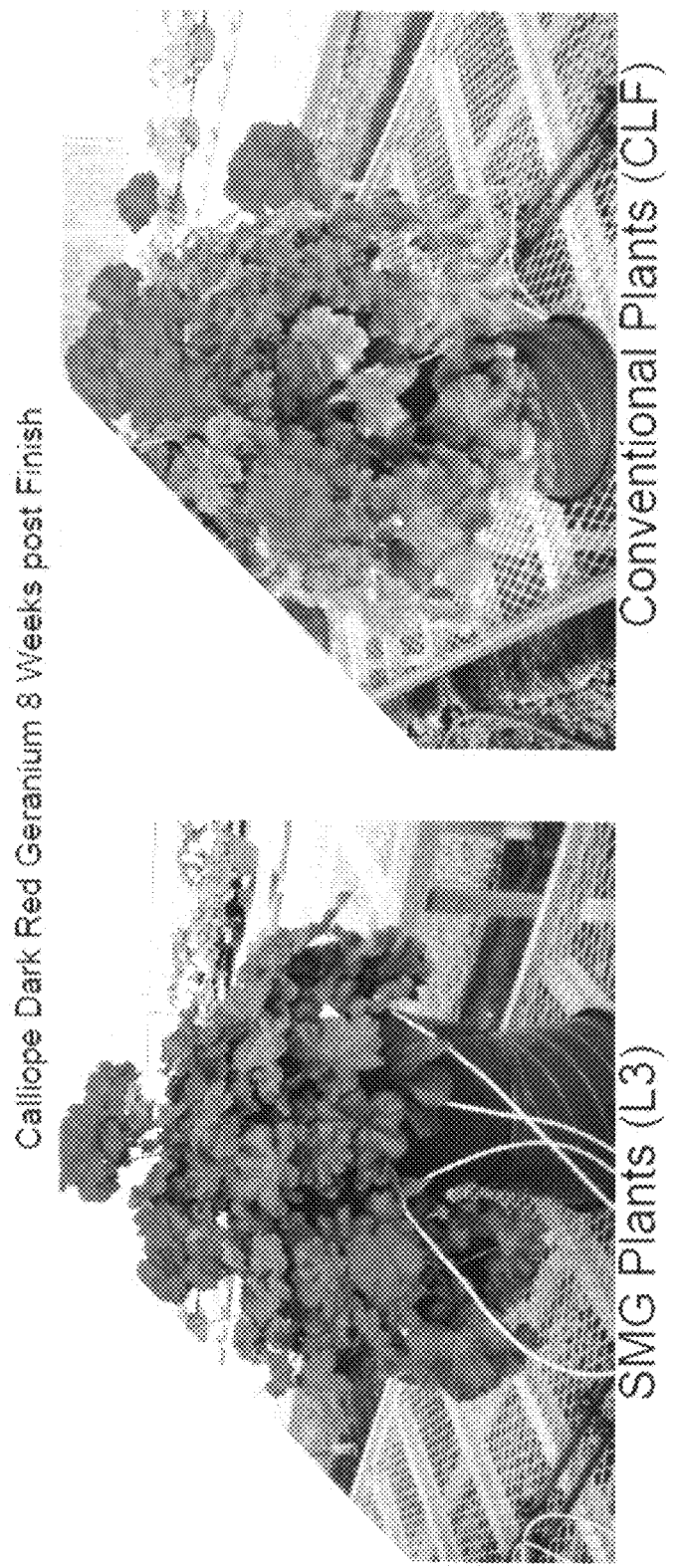
FIG. 15 is a picture comparing the results of germanium plants grown in a hanging basket.
Figure 16:
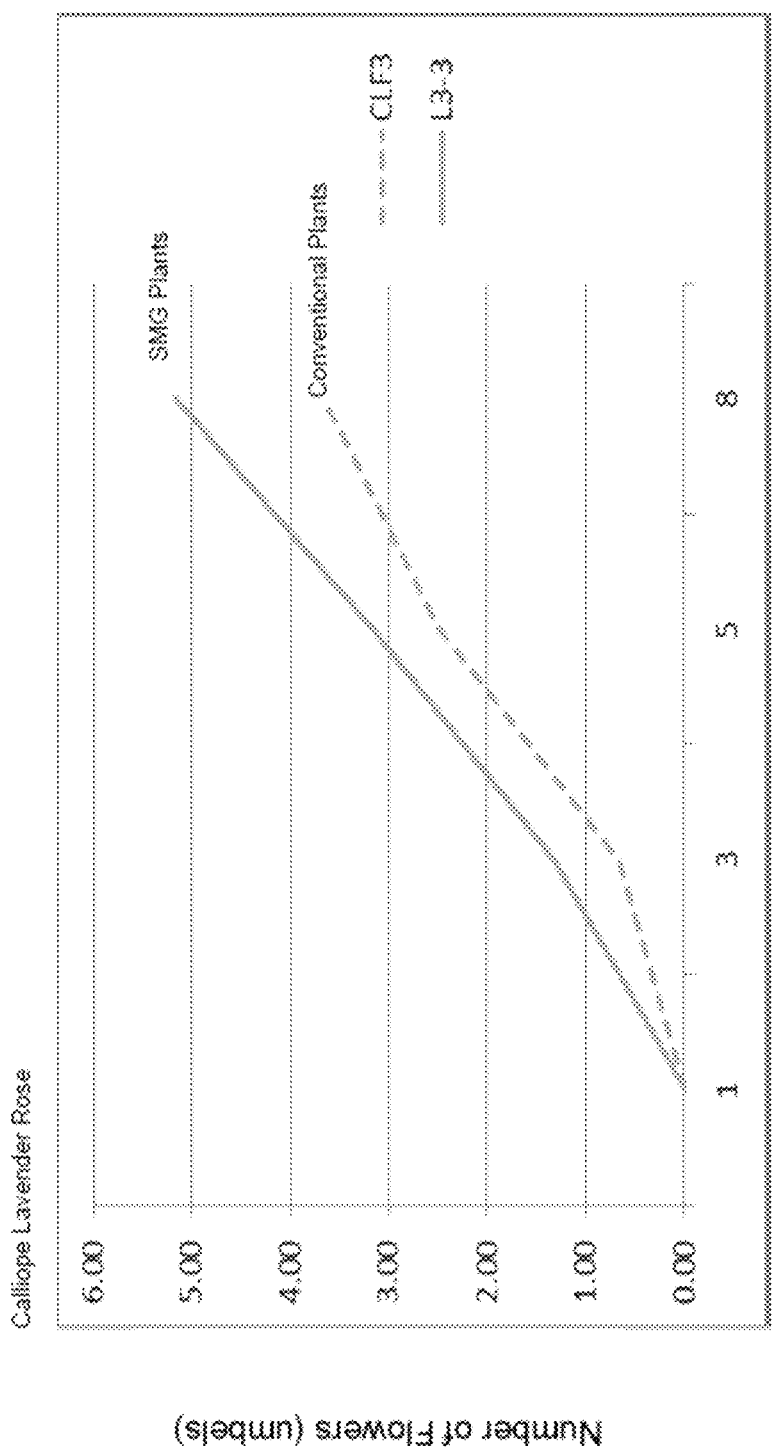
FIG. 16 is a graph showing the number of flowers grown in a hanging basket.

To assess the ability of the growing system to sustain plant life in a hanging basket, fully formed, showcase hanging baskets were grown using the growing system, described herein to grow Calliope Dark Red Geranium. The plant growing system used in this experiment comprised 2.5 grams of 5-6 M OSMOCOTE® Plus (15 Sep. 2012) (controlled-release fertilizer)+15 grams of 3-4 M OSMOCOTE® Mini (19 Jun. 2010) (controlled-release fertilizer) and further amended with fungicide and insecticide drenches (azoxystrobin, mefenoxam, and thiamethoxam). The results of this study are summarized in FIGS. 15-16. As demonstrated in FIGS. 15 and 16, the plant growing system of the present invention delivering unsurpassed consumer season-long garden performance (sustained growth, healthy foliage, abundant flowers) over an eight week period when compared to Geranium using conventional liquid feed.

All references cited herein are incorporated by reference in their entireties.

The invention claimed is:
1. A plant growing system comprising
   (a) plant life;
   (b) a super amount of a controlled-release fertilizer to provide season-long performance; and
   (c) growing media, wherein said plant growing system is contained in a pot or container, and wherein said super amount of a controlled-release fertilizer is 15 to 60 grams of a controlled-release fertilizer per 0.8-1.3 L pot or container, wherein said controlled-release fertilizer releases nutrients over 3-4 months, 5-6 months, or 8-9 months, and further wherein the plant growing system has an electrical conductivity (EC) of about 7 mS/cm to about 18 mS/cm determined using the PourThru method.

2. The plant growing system of claim 1, wherein the plant life is a plant, plant cutting, young plant or seed.

3. The plant growing system of claim 2, wherein the plant is geranium, petunia, impatiens or verbena, vinca, cleome, sunflower, lantana, mandevilla, penta, penstemon, marigold, rudbeckia, viola, pansy or zinnia.

4. The plant growing system of claim 2, wherein the plant has superior genetics that enhance yield, aesthetics and garden performance compared to a plant growing system that does not have a super amount of a controlled-release fertilizer.

5. The plant growing system of claim 2, wherein the plant is a hybrid plant.

6. The plant growing system of claim 1, further comprising a moisture control agent.

7. The plant growing system of claim 6, wherein the moisture control agent comprises a water-absorbable polymer.

8. The plant growing system of claim 1, further comprising a plant protection agent.

9. The plant growing system of claim 8, wherein the plant protection agent is a fungicide, insecticide, or pesticide.

10. The plant growing system of claim 8, wherein the plant protection agent is controlled/time-released.

11. The plant growing system of claim 1, wherein the super amount of a controlled-release fertilizer is 15-30 grams per 0.8-1.3 liter pot or container.

12. The plant growing system of claim 1, wherein the growing media comprises peat, perlite, wheat straw, biodigester remains, bark, coir, or combinations thereof.

13. The plant growing system of claim 1, wherein said pot or container is biodegradable and/or plantable.

14. The plant growing system of claim 13, wherein the biodegradable pot or container comprises a molded material, a formed material, a composted material, a shaped material, or combinations thereof.

15. The plant growing system of claim 13, wherein the biodegradable pot or container comprises peat, wheat straw, coconut fiber, manure, paper pulp, brown or white sugarcane fibers, coir, or combinations thereof.

16. The plant growing system of claim 13, wherein the growing media comprises a soilless growing medium.

17. The plant growing system of claim 1, wherein the super amount of a controlled-release fertilizer is in the form of fertilizer sticks.

18. The plant growing system of claim 1, wherein a super amount of a controlled-release fertilizer is a combination of controlled-release fertilizers.

19. The plant growing system of claim 18, wherein the combination comprises two controlled-release fertilizers.

20. A plant growing system comprising
(a) plant life;
(b) a super amount of a controlled-release fertilizer to provide season-long performance; and
(c) growing media, wherein said plant growing system is contained in a pot or container, wherein said super amount of a controlled-release fertilizer is 15-30 grams of a combination of two controlled-release fertilizers per 0.8-1.3 L pot or container, wherein said controlled-release fertilizer releases nutrients over 3-4 months, 5-6 months, or 8-9 months, and further wherein the plant growing system has an electrical conductivity (EC) of about 7 mS/cm to about 18 mS/cm determined using the PourThru method.

21. The plant growing system of claim 20, wherein said super amount of a controlled release fertilizer is 2.5 grams of 5-6 month controlled-release fertilizer (15 Sep. 2012) and 15 grams of 3-4 month controlled-release fertilizer (19 Jun. 2010) per 0.8-1.3L pot or container.

22. The plant growing system of claim 20, further comprising a moisture control agent.

23. The plant growing system of claim 20, further comprising a plant protection agent.

24. The plant growing system of claim 1, wherein said super amount of a controlled-release fertilizer is 30 grams of 8-9 M controlled-release fertilizer (15 Sep. 2012).

25. A plant growing system comprising (a) plant life;
(b) a super amount
of a controlled-release fertilizer; and
(c) growing media, wherein said plant growing system is contained in a pot or container, wherein said super amount of a controlled-release fertilizer is about 1.5-9 grams of nitrogen per plant, wherein said controlled-release fertilizer releases nutrients over 3-4 months, 5-6 months, or 8-9 months, and further wherein the plant growing system has an electrical conductivity (EC) of about 7 mS/cm to about 18 mS/cm determined using the PourThru method.

26. The plant growing system of claim 1, wherein said super amount of a controlled-release fertilizer is about 2-5 grams of nitrogen per plant.

27. A plant growing system comprising
(a) plant life;
(b) a super amount of a controlled-release fertilizer to provide season-long performance; and
(c) growing media, wherein said plant growing system is contained in a pot or container, and wherein said super amount of a controlled-release fertilizer is about 2-9 grams of nitrogen per 0.8-1.3 L pot or container, wherein said controlled-release fertilizer releases nutrients over 3-4 months or 5-6 months, wherein said plant life is planted in said pot or container comprising said a super amount of a controlled-release fertilizer and said growing media, and further wherein the plant growing system has an electrical conductivity (EC) of about 7 mS/cm to about 18 mS/cm determined using the PourThru method.

28. The plant growing system of claim 25, wherein the plant is geranium, petunia, impatiens or verbena, vinca, cleome, sunflower, lantana, mandevilla, penta, penstemon, marigold, rudbeckia, viola, pansy or zinnia.

29. The plant growing system of claim 25, wherein the plant has superior genetics that enhance yield, aesthetics and garden performance compared to a plant growing system that does not have a super amount of a controlled-release fertilizer.

30. The plant growing system of claim 25, wherein the plant is a hybrid plant.

31. The plant growing system of claim 25, further comprising a moisture control agent.

32. The plant growing system of claim 25, further comprising a plant protection agent.

33. The plant growing system of claim 25, wherein the growing media comprises peat, perlite, wheat straw, biodigester remains, bark, coir, or combinations thereof.

34. The plant growing system of claim 25, wherein said pot or container is biodegradable and/or plantable.

35. The plant growing system of claim 25, wherein the growing media comprises a soilless growing medium.

36. The plant growing system of claim 25, wherein a super amount of a controlled-release fertilizer is a combination of controlled-release fertilizers.

37. The plant growing system of claim 1, wherein said controlled-release fertilizer is a 3-4 month controlled-release fertilizer (19 Jun. 2010), a 5-6 month controlled-release fertilizer (15 Sep. 2012), a 8-9 month controlled-release fertilizer (17 May 2011) or a 8-9 month controlled-release fertilizer (15 Sep. 2012).

38. The plant growing system of claim 25, wherein said controlled-release fertilizer is a 3-4 month controlled-release fertilizer (19 Jun. 2010), a 5-6 month controlled-release fertilizer (15 Sep. 2012), a 8-9 month controlled-release fertilizer (17 May 2011) or a 8-9 month controlled-release fertilizer (15 Sep. 2012).

39. The plant growing system of claim 27, wherein said controlled-release fertilizers is 3-4 month controlled-release fertilizer (19 Jun. 2010) or 5-6 month controlled-release fertilizer (15 Sep. 2012).

\* \* \* \* \*

UNITED STATES PATENT AND TRADEMARK OFFICE
CERTIFICATE OF CORRECTION

PATENT NO. : 8,813,423 B2
APPLICATION NO. : 13/844328
DATED : August 26, 2014
INVENTOR(S) : Robert W. Harriman et al.

Page 1 of 3

It is certified that error appears in the above-identified patent and that said Letters Patent is hereby corrected as shown below:

In the Specification:

Col. 5, line 18, "(15 Sep. 2012)", should be corrected to read --(15-9-12)--;

Col. 5, lines 19-20, "(16 Sep. 2012)", should be corrected to read --(16-9-12)--;

Col. 5, line 20, "(19 Jun. 2010)", should be corrected to read --(19-6-10)--;

Col. 8, line 9, "(15 Sep. 2012)", should be corrected to read --(15-9-12)--;

Col. 8, lines 10-11, "(15 Sep. 2012)", should be corrected to read --(15-9-12)--;

Col. 8, line 12, "(15 Sep. 2012)", should be corrected to read --(15-9-12)--;

Col. 8, line 14, "(15 Sep. 2012)", should be corrected to read --(15-9-12)--;

Col. 8, lines 15-16, "(19 Jun. 2010)", should be corrected to read --(19-6-10)--;

Col. 8, line 17, "(15 Sep. 2012)", should be corrected to read --(15-9-12)--;

Col. 8, line 18, "(19 Jun. 2010)", should be corrected to read --(19-6-10)--;

Col. 8, line 20, "(15 Sep. 2012)", should be corrected to read --(15-9-12)--;

Col. 10, line 54, "(15 Sep. 2012)", should be corrected to read --(15-9-12)--;

Col. 15, line 1, "(17 May 2011)", should be corrected to read --(17-5-11)--;

Col. 15, line 17, "(15 Sep. 2012", should be corrected to read --(15-9-12)--;

Col. 15, line 31, "(17 May 2011)", should be corrected to read --(17-5-11)--;

Col. 15, line 57-58, "(15 Sep. 2012)", should be corrected to read --(15-9-12)--;

Signed and Sealed this
Sixth Day of January, 2015

Michelle K. Lee
*Deputy Director of the United States Patent and Trademark Office*

In the Specification:

Col. 15, line 59, "(15 Sep. 2012)", should be corrected to read --(15-9-12)--;

Col. 15, line 61, "(19 Jun. 2010)", should be corrected to read --(19-6-10)--;

Col. 16, line 9, "(15 Sep. 2012)", should be corrected to read --(15-9-12)--;

Col. 16, line 11, "(15 Sep. 2012)", should be corrected to read --(15-9-12)--;

Col. 16, line 12, "(19 Jun. 2010)", should be corrected to read --(19-6-10)--;

Col. 16, line 34, "(15 Sep. 2012)", should be corrected to read --(15-9-12)--;

Col. 16, lines 35-36, "(19 Jun. 2010)", should be corrected to read --(19-6-10)--.

In the Claims:

Col. 17, lines 61, 62 and 63,

Claim 21, line 3, please change "(15 Sep. 2012)" to --(15-9-12)--; and lines 4-5, please change "(19 Jun. 2010)" to --(19-6-10)--.

Col. 18, line 3,

Claim 24, line 3, please change "(15 Sep. 2012)" to --(15-9-12)--.

Col. 18, lines 61, 62, 63 and 64,

Claim 37, line 3, please change "(19 Jun. 2010)" to --(19-6-10)--;

line 4, please change "(15 Sep. 2012)" to --(15-9-12)--;

line 5, please change "(17 May 2011)" to --(17-5-11)--; and line 6, please change "(15 Sep. 2012)" to --(15-9-12)--.

Col. 18, line 67 and Col. 19, lines 1, 2 and 3,

Claim 38, line 3, please change "(19 Jun. 2010)" to --(19-6-10)--;

line 4, please change "(15 Sep. 2012)" to --(15-9-12)--;

line 5, please change "(17 May 2011)" to --(17-5-11)--; and line 6, please change "(15 Sep. 2012)" to --(15-9-12)--.

CERTIFICATE OF CORRECTION (continued)
U.S. Pat. No. 8,813,423 B2

Col. 19, lines 6 and 7,

Claim 39, line 3, please change "(19 Jun. 2010)" to --(19-6-10)--; and line 4, please change "(15 Sep. 2012)" to --(15-9-12)--.